United States Patent
Ota et al.

(10) Patent No.: US 8,274,646 B2
(45) Date of Patent: Sep. 25, 2012

(54) MEASUREMENT SYSTEM AND MEASUREMENT PROCESSING METHOD

(75) Inventors: Kazuyuki Ota, Yokohama (JP); Masakazu Matsugu, Yokohama (JP); Kenji Saitoh, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 157 days.

(21) Appl. No.: 12/816,069

(22) Filed: Jun. 15, 2010

(65) Prior Publication Data

US 2010/0328649 A1    Dec. 30, 2010

(30) Foreign Application Priority Data

Jun. 24, 2009  (JP) ................................. 2009-150322

(51) Int. Cl.
*G01N 21/00*  (2006.01)
(52) U.S. Cl. ....................................................... 356/73
(58) Field of Classification Search ............. 356/72–73, 356/612, 610
See application file for complete search history.

(56) References Cited

U.S. PATENT DOCUMENTS

| 7,286,229 B1 * | 10/2007 | Meeks ........................... 356/369 |
| 2010/0091104 A1 * | 4/2010 | Sprigle et al. ................. 348/136 |

FOREIGN PATENT DOCUMENTS

| JP | 11-044515 | 2/1999 |
| JP | 2006-292385 | 10/2006 |
| JP | 3847686 | 11/2006 |

* cited by examiner

*Primary Examiner* — Tarifur Chowdhury
*Assistant Examiner* — Abdullahi Nur
(74) *Attorney, Agent, or Firm* — Cowan, Liebowitz & Latman, P.C.

(57) ABSTRACT

This invention is directed to extract the scattering characteristic of a measurement target together when measuring the surface shape in a measurement system, which measures the surface shape of a measurement target, by the pattern projection method. To accomplish this, the measurement system includes an illumination unit which irradiates a measurement target with dot pattern light, a reflected light measurement unit which receives the reflected light at a reflection angle almost equal to a incident angle, and a reflected light extraction unit which extracts the inclination of the surface of the measurement target, based on the shift amount between the light receiving position of the received reflected light and a predetermined reference position, and extracts the luminance value of the reflected light and the dot diameter of the dot pattern light as information about the scattering characteristic.

8 Claims, 41 Drawing Sheets

F I G. 14
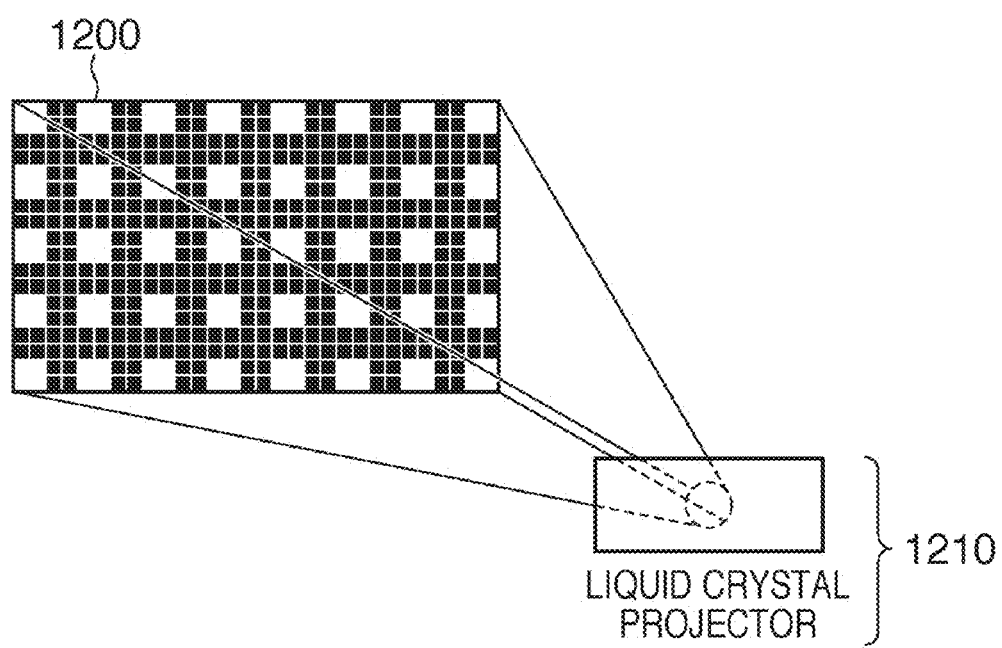

15A

15B

15C

F I G. 29
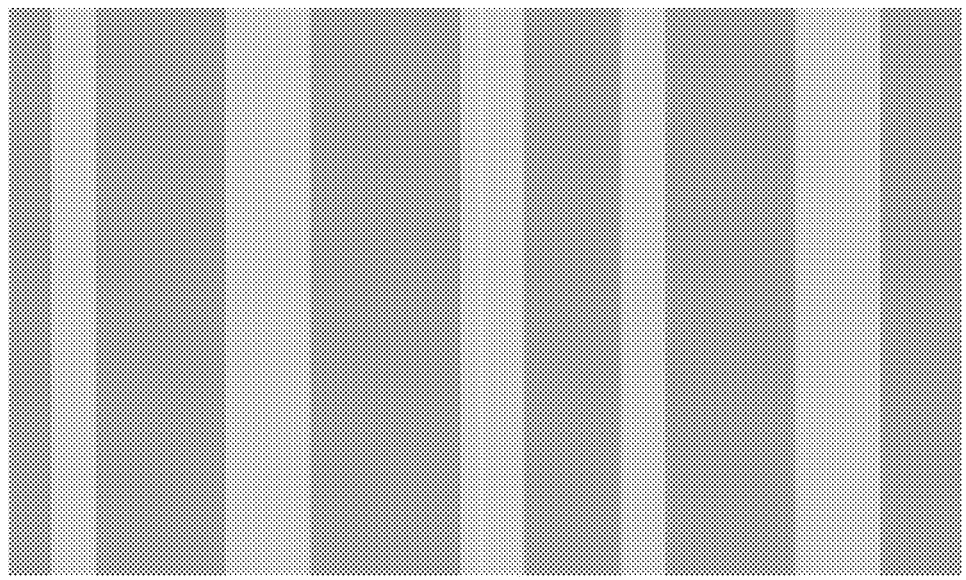

F I G. 31
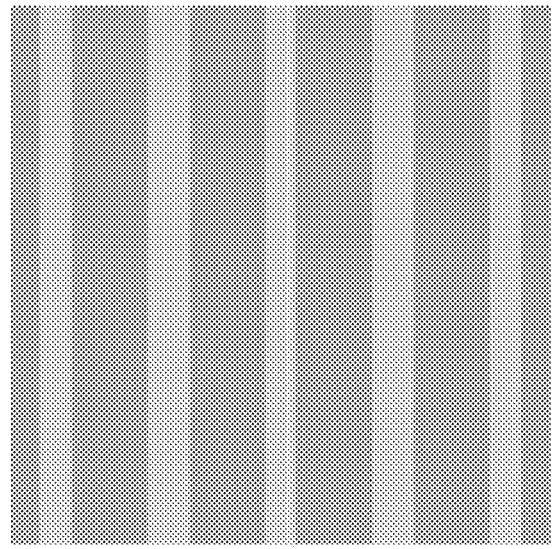
F I G. 32
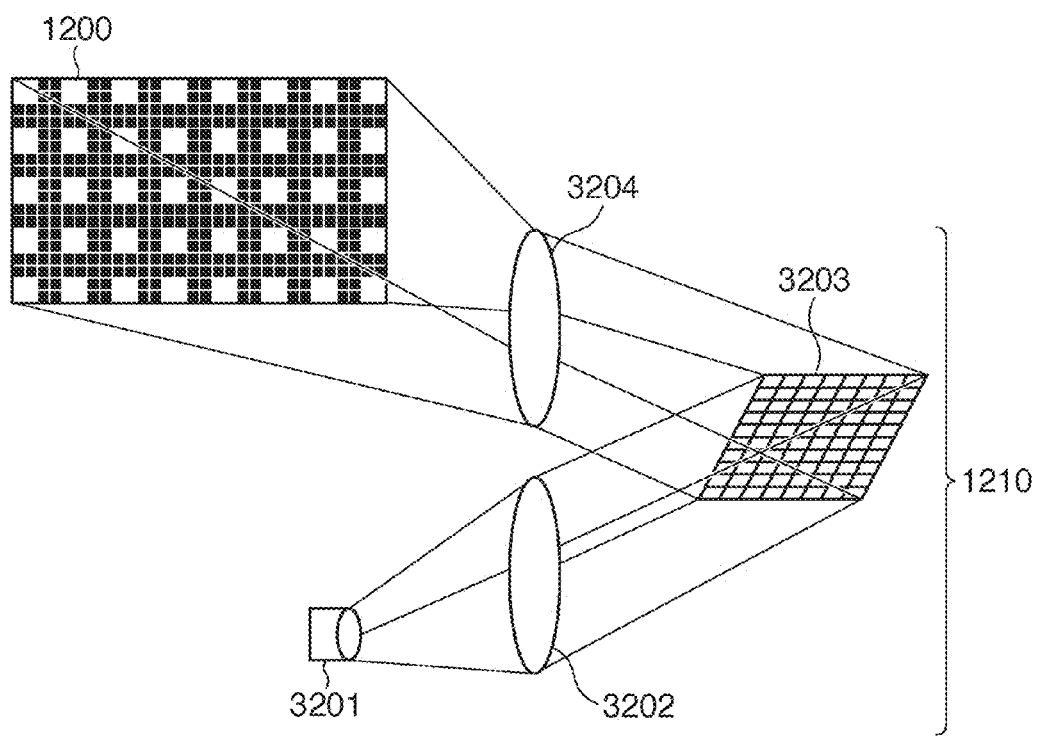

F I G. 44
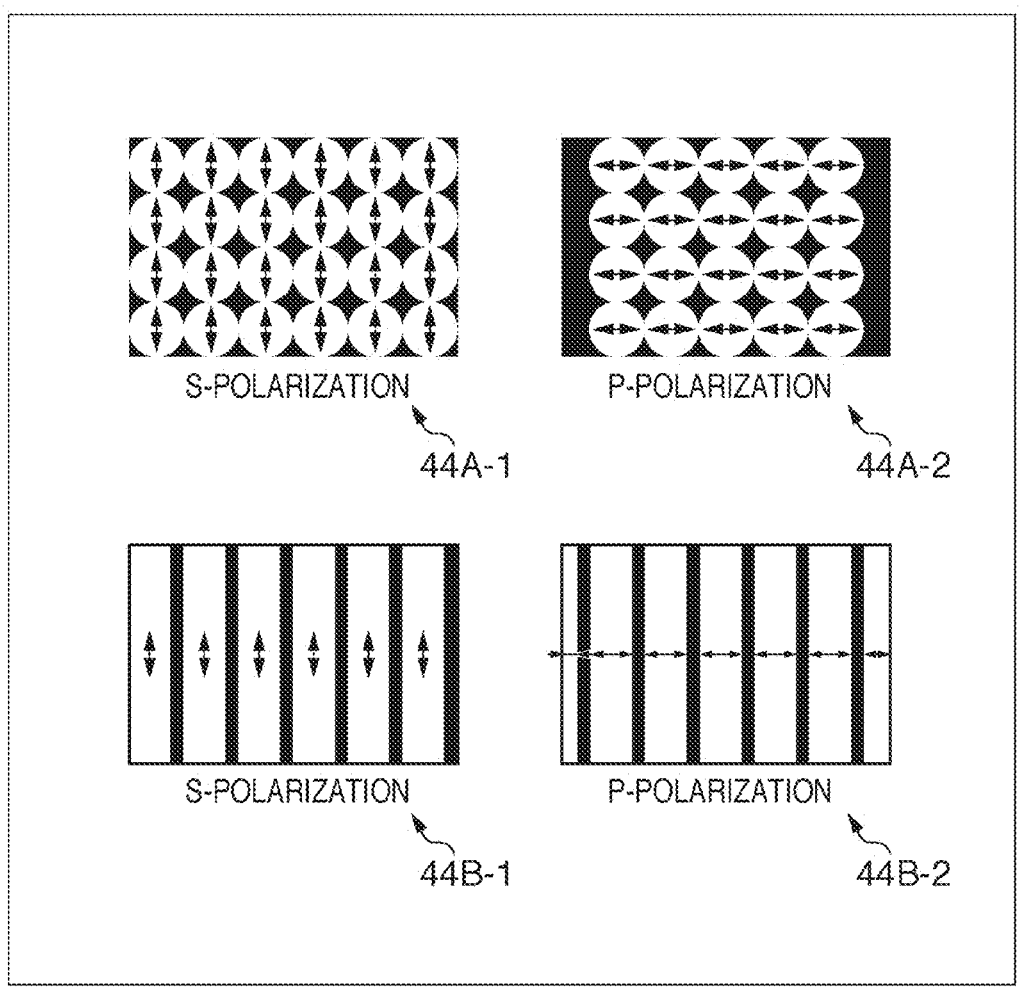

MEASUREMENT SYSTEM AND MEASUREMENT PROCESSING METHOD

BACKGROUND OF THE INVENTION

1. Field of the Invention

The present invention relates to a measurement system and measurement processing method.

2. Description of the Related Art

There has conventionally been known a pattern projection method of measuring a surface shape by irradiating a measurement target with pattern light. Various proposals have been made for a surface shape calculation method, pattern light control method, and the like.

For example, Japanese Patent No. 3847686 discloses an arrangement in which modulated pattern light is generated by switching micro-optical surfaces arrayed in a matrix in accordance with a predetermined modulation pattern, and the measurement target is irradiated with the modulated pattern light. Further, in an arrangement further disclosed in this reference, an irradiation image formed by focusing pattern light reflected by the measurement target is modulated to extract the light quantity change component of the irradiation image. Parallax information corresponding to the distance to the measurement target is calculated and output as the surface shape of the measurement target.

Japanese Patent Laid-Open No. 11-044515 discloses a technique of controlling pattern light. In this technique, the interval of straight stripe pattern light that has a wavelength outside the visible region and is emitted to acquire distance information to a measurement target, or the beam scanning interval is controlled based on acquired distance information.

Further, Japanese Patent Laid-Open No. 2006-292385 discloses an arrangement in which the measurement target is irradiated with pattern light. In this arrangement, the type and number of pattern light beams emitted by an optical space modulation element are adaptively controlled based on the feature amount of a sensed image or a change of the feature amount.

The techniques disclosed in these references are used to measure the surface shape of a measurement target. These references do not disclose an arrangement that measures the surface characteristics of a measurement target other than the surface shape.

In a method of measuring a surface shape by irradiating a measurement target with pattern light, like the pattern projection method, light reflected by the surface of the measurement target is not a little affected by the surface state of the measurement target.

For example, when the measurement target has a fine microstructure on the surface (smooth surface), the specular reflection component is dominant as a component contained in reflected light. To the contrary, when the measurement target has a rough microstructure on the surface (rough surface), the specular reflection component and scattering component coexist as components contained in reflected light.

The ratio (to be referred to as the "scattering characteristic" of the surface of a measurement target) of the specular reflection component and scattering component changes depending on the surface state of the measurement target.

When the surface shape of a measurement target is measured by the pattern projection method, its surface state is desirably measured together. Similarly, pattern light to irradiate a measurement target is desirably controlled in consideration of the surface state of the measurement target in order to measure the scattering characteristic indicating the surface state of the measurement target at high precision.

SUMMARY OF THE INVENTION

The present invention has been made to solve the above problems.

A measurement system according to the present invention comprises the following arrangement. That is, a measurement system comprising: an irradiation unit configured to irradiate a measurement target with predetermined pattern light at a predetermined incident angle; a reception unit configured to receive, at a reflection angle substantially equal to the incident angle, reflected light of the pattern light irradiating the measurement target; a first extraction unit configured to extract information about a surface shape of the measurement target in a region irradiated with the pattern light, based on a shift amount between a light receiving position of the reflected light received by the reception unit, and a predetermined reference position; a second extraction unit configured to extract, as information about a scattering characteristic of the measurement target in the region irradiated with the pattern light, information about a luminance value of the reflected light received by the reception unit, and information indicating a spread of the pattern light upon reflection by the measurement target; and an output unit configured to output, as measurement results of the measurement target, the information about the surface shape of the measurement target that is extracted by the first extraction unit, and the information about the scattering characteristic of the measurement target that is extracted by the second extraction unit.

According to the present invention, first, the scattering characteristic of a measurement target can be measured together when measuring the surface shape in a measurement system which measures the surface shape of a measurement target by the pattern projection method.

Second, the measurement precision of the scattering characteristic of the measurement target can be improved by controlling pattern light based on the measured scattering characteristic.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 14 is a view exemplifying an illumination unit using a liquid crystal projector;

FIG. 29 is a view for explaining the stripe pattern light control method;

FIG. 31 is a view for explaining a stripe pattern light control method;

FIG. 32 is a view exemplifying an illumination unit using a DMD;

FIG. 44 is a view for explaining switching of the polarization characteristic of pattern light.

DESCRIPTION OF THE EMBODIMENTS

Embodiments of the present invention will now be described in detail in accordance with the accompanying drawings.

In a description of the following embodiments, a "mirror surface system" is a measurement target having a surface state in which the specular reflection component is dominant in reflected light. This measurement target has a fine microstructure on the surface and is formed from a smooth material (for example, mirror or metal). A "rough surface system" is a measurement target having a surface state in which the specular reflection component and scattering component coexist in reflected light. This measurement target is rougher in microstructure on the surface than the mirror surface system and is formed from a rough material (for example, metal or paper having undergone surface treatment). Among rough surface systems, a measurement target in which the scattering component is dominant in reflected light is especially called a rough surface system (perfectly diffusing surface system).

First Embodiment

<1. Configuration of Measurement System>

Figure 1:
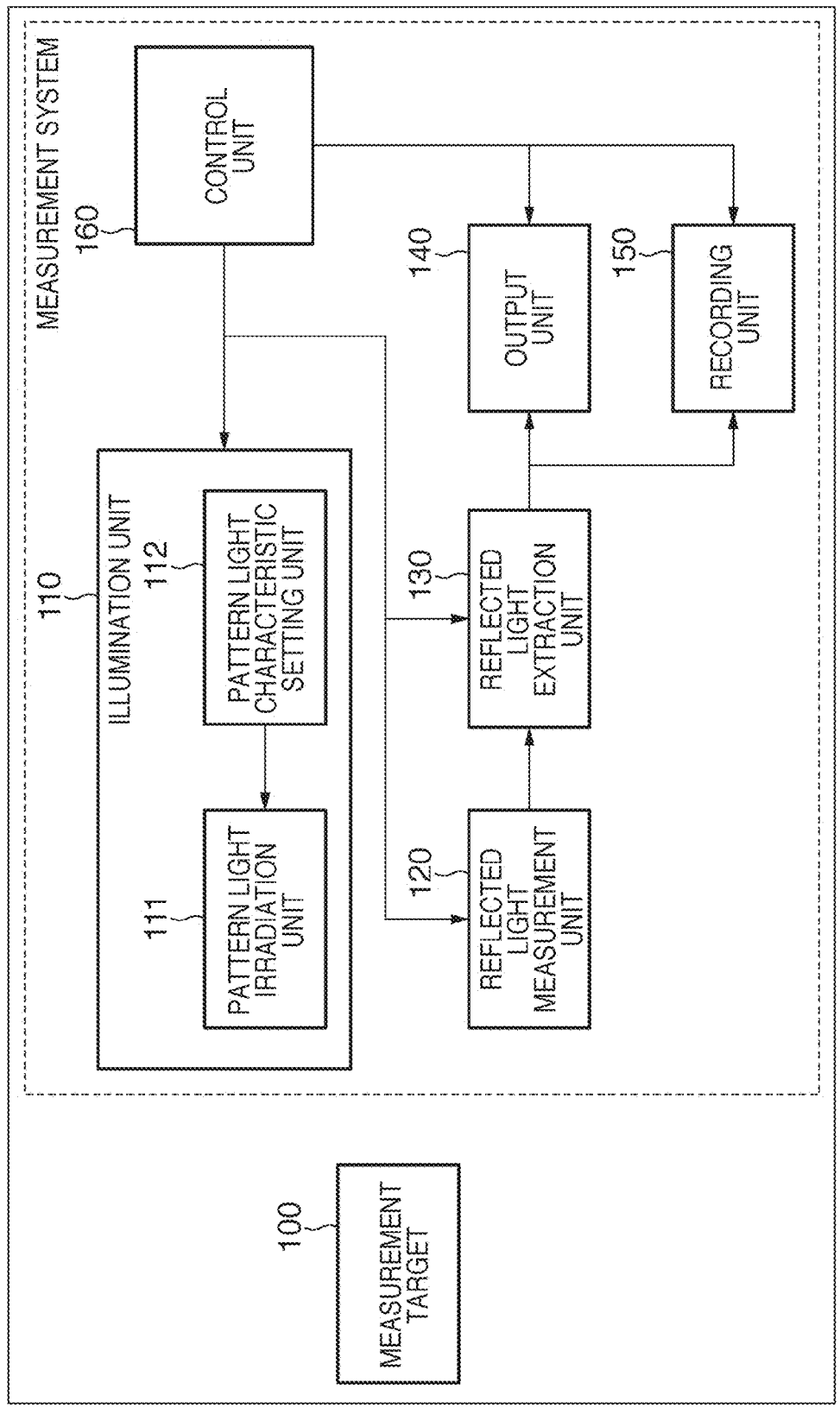
FIG. 1 is a block diagram showing the configuration of a measurement system.

FIG. 1 is a block diagram showing the configuration of a measurement system capable of measuring the surface shape and scattering characteristic of a measurement target by the pattern projection method according to the first embodiment of the present invention.

In FIG. 1, the measurement system according to the first embodiment measures the surface shape and scattering characteristic of a measurement target 100. An illumination unit 110 irradiates the measurement target 100 with pattern light, and includes a pattern light irradiation unit 111 and pattern light characteristic setting unit 112.

The pattern light irradiation unit 111 is incorporated in the illumination unit 110 and irradiates the measurement target 100 with pattern light. The pattern light characteristic setting unit 112 sets the characteristics of pattern light with which the pattern light irradiation unit 111 irradiates the measurement target 100.

A reflected light measurement unit 120 is arranged in the specular reflection direction of reflected light of pattern light which has irradiated the measurement target. The reflected light measurement unit 120 receives light reflected by the measurement target 100. The reflected light measurement unit 120 includes a photosensor (light receiving unit) which receives light reflected by the measurement target 100. The relationship between the scattering characteristic of the measurement target 100 and received reflected light will be described later. A reflected light extraction unit 130 extracts information about the scattering characteristic of the measurement target 100 and information about the surface shape from reflected light received by the reflected light measurement unit 120. The method of extracting information about the scattering characteristic and surface shape will be explained later.

An output unit 140 outputs the result of extraction by the reflected light extraction unit 130 as a measurement result. The output unit 140 includes a monitor for displaying a measurement result, and a printer. A recording unit 150 records the result of extraction by the reflected light extraction unit 130 as a measurement result. The recording unit 150 includes a hard disk and flash memory for recording digital data of the measurement result.

A control unit 160 controls the operations of the illumination unit 110, reflected light measurement unit 120, reflected light extraction unit 130, output unit 140, and recording unit 150. The control unit 160 includes a CPU, a RAM, and a ROM which stores various control programs.

The control programs stored in the ROM include a control program for controlling pattern light emitted by the illumination unit 110, a control program for controlling the reflected light measurement unit 120, and a control program for controlling the reflected light extraction unit 130. The control programs further include a control program for controlling the output unit 140, and a control program for controlling the recording unit 150.

The configuration of the measurement system according to the first embodiment has been described. Note that the configuration of the measurement system is not limited to this. For example, some of the blocks shown in FIG. 1 may be replaced with a general personal computer or the like.

<2. Sequence of Measurement Processing in Measurement System>

Figure 2:
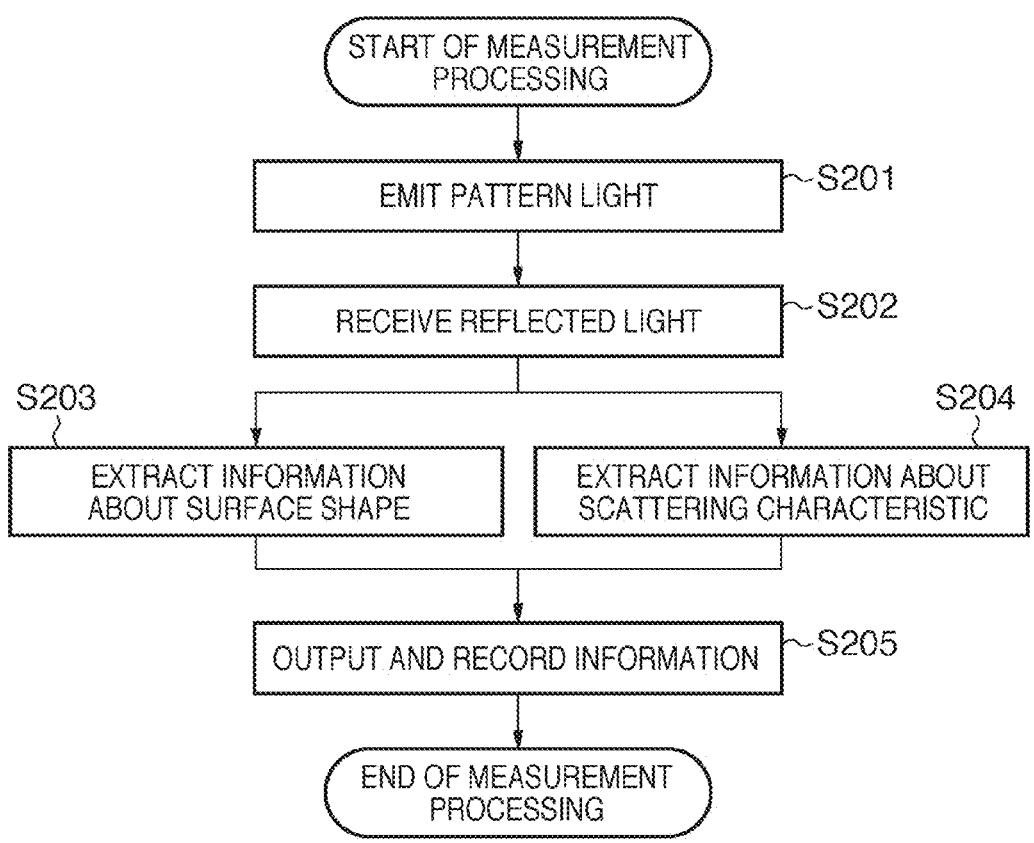
FIG. 2 is a flowchart showing the sequence of measurement processing in the measurement system.

FIG. 2 is a flowchart showing the sequence of measurement processing in the measurement system according to the first embodiment. The sequence of measurement processing in the measurement system according to the first embodiment will be explained with reference to FIG. 2.

When a measurement processing start instruction is input, the control unit 160 sends a pattern light setting signal to the illumination unit 110 in step S201. The illumination unit 110 irradiates the measurement target 100 with pattern light based on the pattern light setting signal.

In step S202, the control unit 160 instructs the reflected light measurement unit 120 to receive the light reflected by the measurement target 100. Then, the reflected light measurement unit 120 receives the reflected light of the pattern light which has irradiated the measurement target 100.

In step S203, the reflected light extraction unit 130 functions as a surface shape extraction unit (first extraction unit), and extracts information about the surface shape of the measurement target 100, based on the reflected light received by the reflected light measurement unit 120. A concrete method of extracting information about the surface shape of the measurement target 100 will be described later.

In step S204, the reflected light extraction unit 130 functions as a scattering characteristic extraction unit (second extraction unit), and extracts information about the scattering characteristic of the measurement target 100, based on the reflected light received by the reflected light measurement unit 120. A concrete method of extracting information about the scattering characteristic of the measurement target 100 will be described later.

In step S205, based on an instruction from the control unit 160, the pieces of information about the surface shape and scattering characteristic of the measurement target 100 that have been extracted by the reflected light extraction unit 130 are output by the output unit 140 and recorded by the recording unit 150 as measurement results. The output unit 140 displays, as measurement results on the monitor or the like, the pieces of information about the surface shape and scattering characteristic of the measurement target 100. The recording unit 150 stores, as digital data of the measurement results in a storage device such as a hard disk or flash memory, the pieces of information about the surface shape and scattering characteristic of the measurement target 100.

<3. Method (1) of Extracting Information about Scattering Characteristic>

A method of extracting information about the scattering characteristic will be described. First, the relationship between the surface state of the measurement target and reflected light will be explained.

Figure 3:
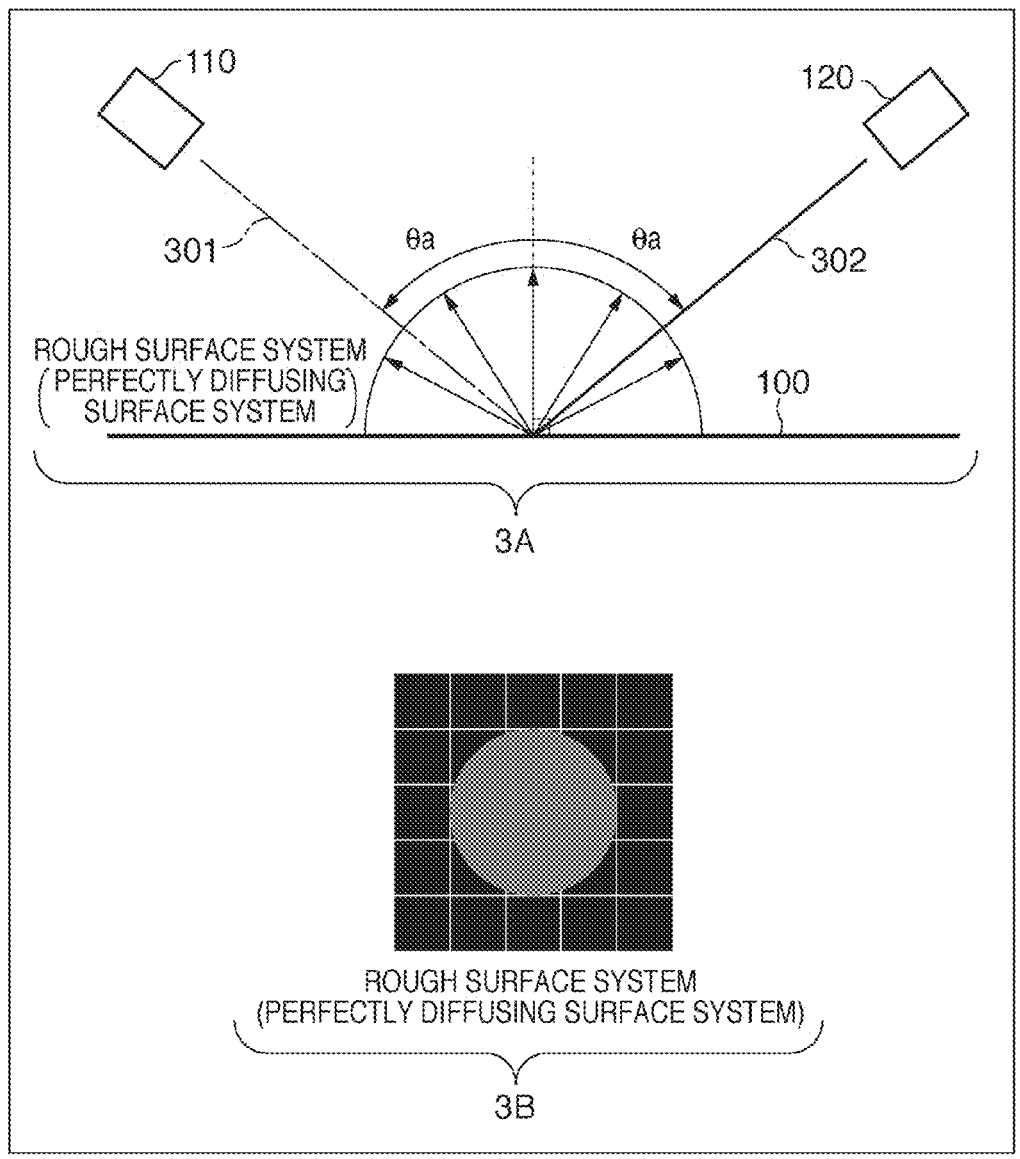
FIG. 3 is a view for explaining a method of extracting information about the scattering characteristic.

3A of FIG. 3 shows the relationship between pattern light with which the illumination unit 110 irradiates the measurement target 100, and the reflected light when the measurement target 100 is a perfectly diffusing surface system. Pattern light 301 (dot pattern light) with which the illumination unit 110 irradiates the measurement target 100 at an incident angle θa is received by the reflected light measurement unit 120 as light 302 reflected at a reflection angle θa (angle almost equal to the incident angle).

3B of FIG. 3 exemplifies the result of receiving light by the reflected light measurement unit 120. In FIG. 3, one grid corresponds to one photosensor that receives reflected light. When the measurement target 100 is a perfectly diffusing surface system, pattern light (dot pattern light) incident on a given point on the surface of the measurement target 100 is reflected not only in the specular reflection direction but also in the scattering direction. The reflected light received by the reflected light measurement unit 120 contains a component (scattering component) which shines broadly as a whole. In this way, when the measurement target 100 irradiated with dot pattern light is a perfectly diffusing surface system, the scattering component is dominant. A sensed image is a slightly broadened dot having uniform brightness as a whole, as shown in 3B of FIG. 3.

Figure 4:
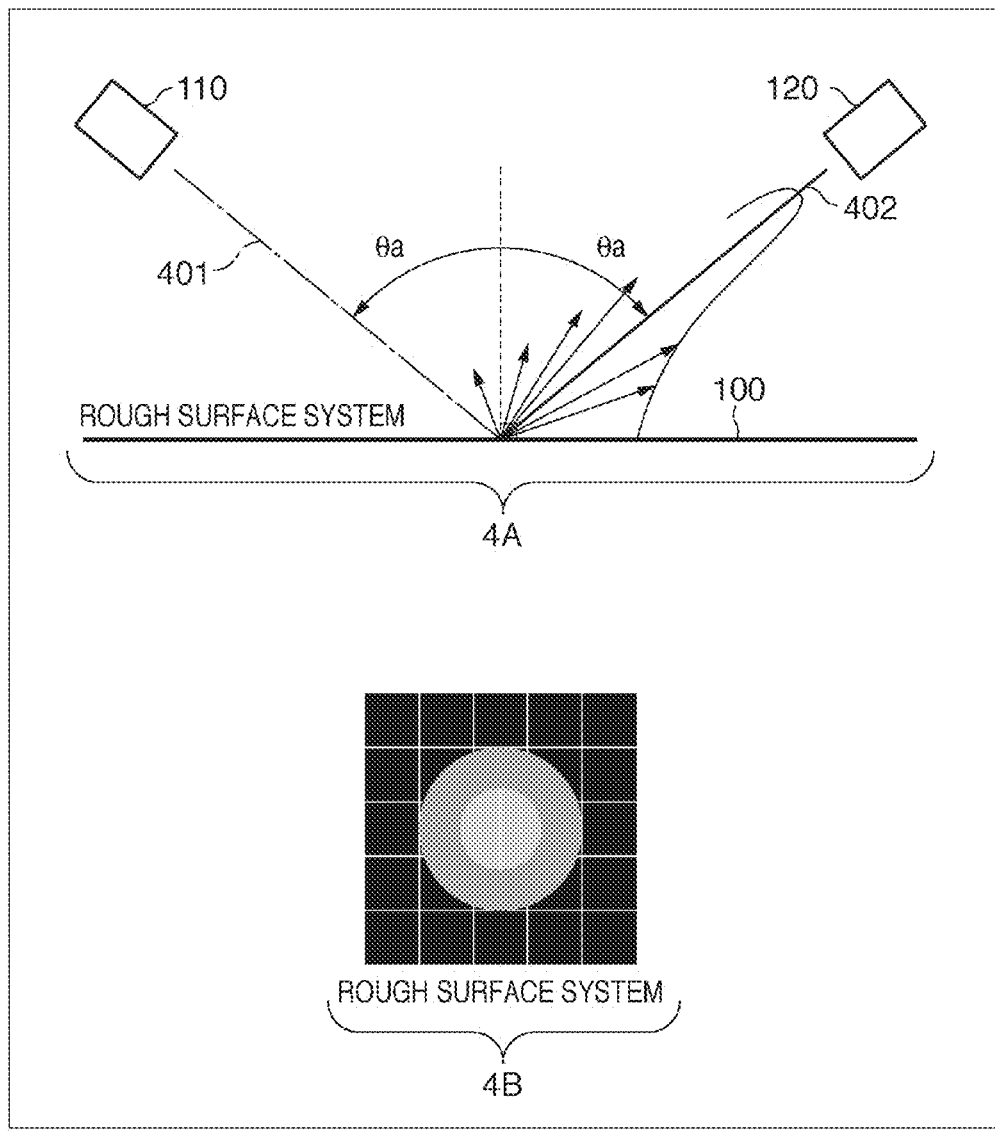
FIG. 4 is a view for explaining the method of extracting information about the scattering characteristic.

4A of FIG. 4 shows the relationship between pattern light (dot pattern light) with which the illumination unit 110 irradiates the measurement target 100, and the reflected light when the measurement target 100 is a rough surface system. Pattern light 401 which irradiates the measurement target 100 at the incident angle θa is received by the reflected light measurement unit 120 as light 402 reflected at the reflection angle θa.

4B of FIG. 4 exemplifies the result of receiving light by the reflected light measurement unit 120. When the measurement target is a rough surface system, pattern light (dot pattern light) incident on a given point on the surface of the measurement target 100 is reflected as reflected light containing both the specular reflection component and scattering component. Hence, the scattering component and specular reflection component coexist in the reflected light received by the reflected light measurement unit 120.

As described above, when the measurement target 100 is a rough surface system, the scattering component and specular reflection component coexist. A sensed image is a slightly broadened dot having uniform brightness as a whole and a bright point at the center, as shown in 4B of FIG. 4.

Figure 5:
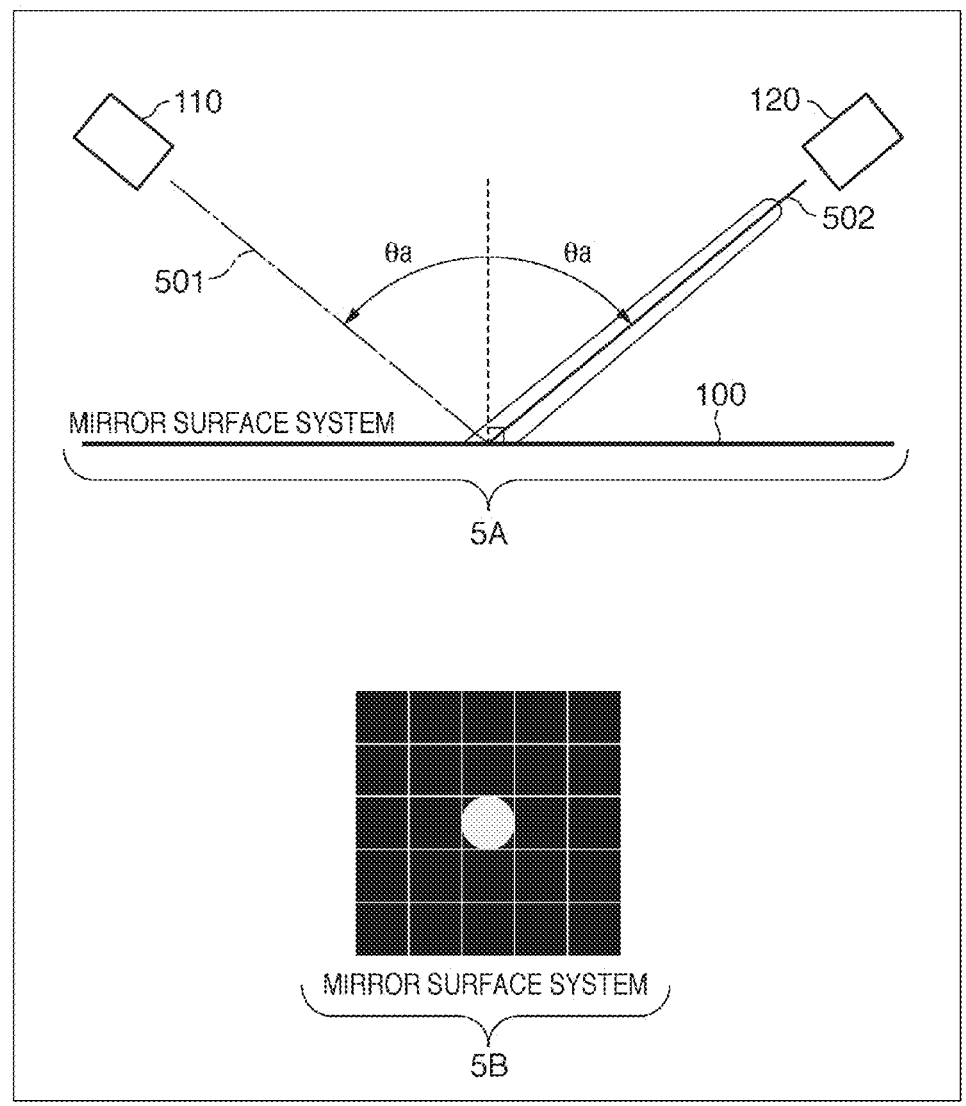
FIG. 5 is a view for explaining the method of extracting information about the scattering characteristic.

5A of FIG. 5 shows the relationship between pattern light (dot pattern light) with which the illumination unit 110 irradiates the measurement target 100, and the reflected light when the surface of the measurement target 100 is a mirror surface system. Pattern light 501 which irradiates the measurement target 100 at the incident angle θa is received by the reflected light measurement unit 120 as light 502 reflected at the reflection angle θa.

5B of FIG. 5 exemplifies the result of receiving light by the reflected light measurement unit 120. When the measurement target is a mirror surface system, pattern light (dot pattern light) incident on a given point on the surface of the measurement target 100 is reflected as reflected light containing only the specular reflection component. The reflected light received by the reflected light measurement unit 120 contains only the specular reflection component. In this fashion, when the measurement target 100 irradiated with dot pattern light is a mirror surface system, the specular reflection component is dominant. A sensed image is a dot having only a very bright point at the center, as shown in 5B of FIG. 5.

As described above, when dot pattern light is emitted, the reflected light changes in the spread and luminance distribution of the dot depending on the surface state of the measurement target 100. From this, the reflected light extraction unit 130 in the measurement system according to the first embodiment extracts, as information about the scattering characteristic, feature amounts such as the dot diameter, the maximum, minimum, and average luminance values within the dot, variations of the luminance value within the dot, and the luminance profile.

<4. Method (2) of Extracting Information about Scattering Characteristic>

Next, another method of extracting information about the scattering characteristic by the reflected light extraction unit 130 in the measurement system according to the first embodiment will be described.

Figure 6:
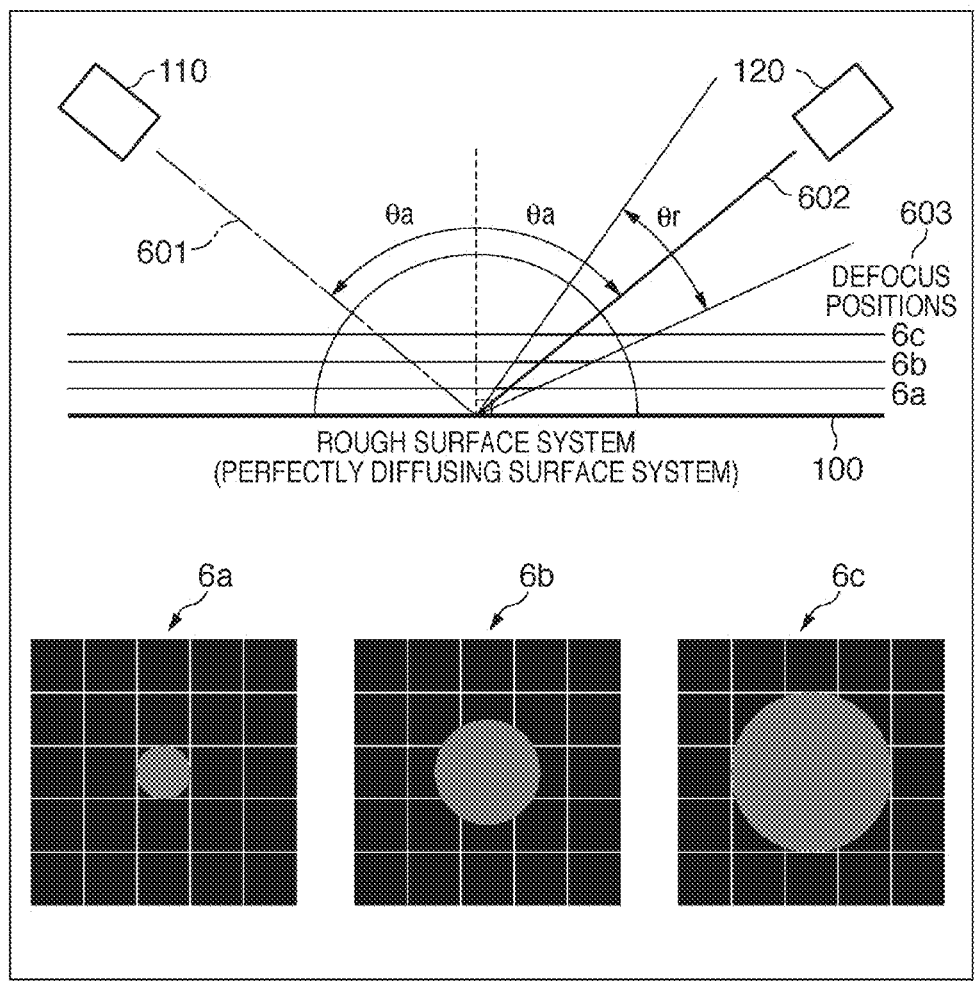
FIG. 6 is a view for explaining another method of extracting information about the scattering characteristic.

FIG. 6 is a view exemplifying the relationship between pattern light and the reflected light, and the results of receiving the reflected light when the measurement target 100 is a perfectly diffusing surface system. Pattern light (dot pattern light) 601 with which the illumination unit 110 irradiates the measurement target 100 at the incident angle θa is received by the reflected light measurement unit 120 as light 602 reflected at the reflection angle θa.

When the reflected light measurement unit 120 receives the reflected light 602 while the surface of the measurement target 100 is in focus, the dot diameter of a sensed image is almost equal to the diameter of the emitted dot pattern light. In contrast, a plurality of focus positions 6a to 6c are set as defocus positions 603 in the reflection direction of the reflected light 602. The reflected light 602 is received at each defocus position. In this case, light scatters in a wider region at a position where the defocus amount is larger. For this reason, the dot diameter of the sensed image becomes larger sequentially from 6a to 6c, as represented on the lower part of the sheet surface of FIG. 6.

Figure 7:
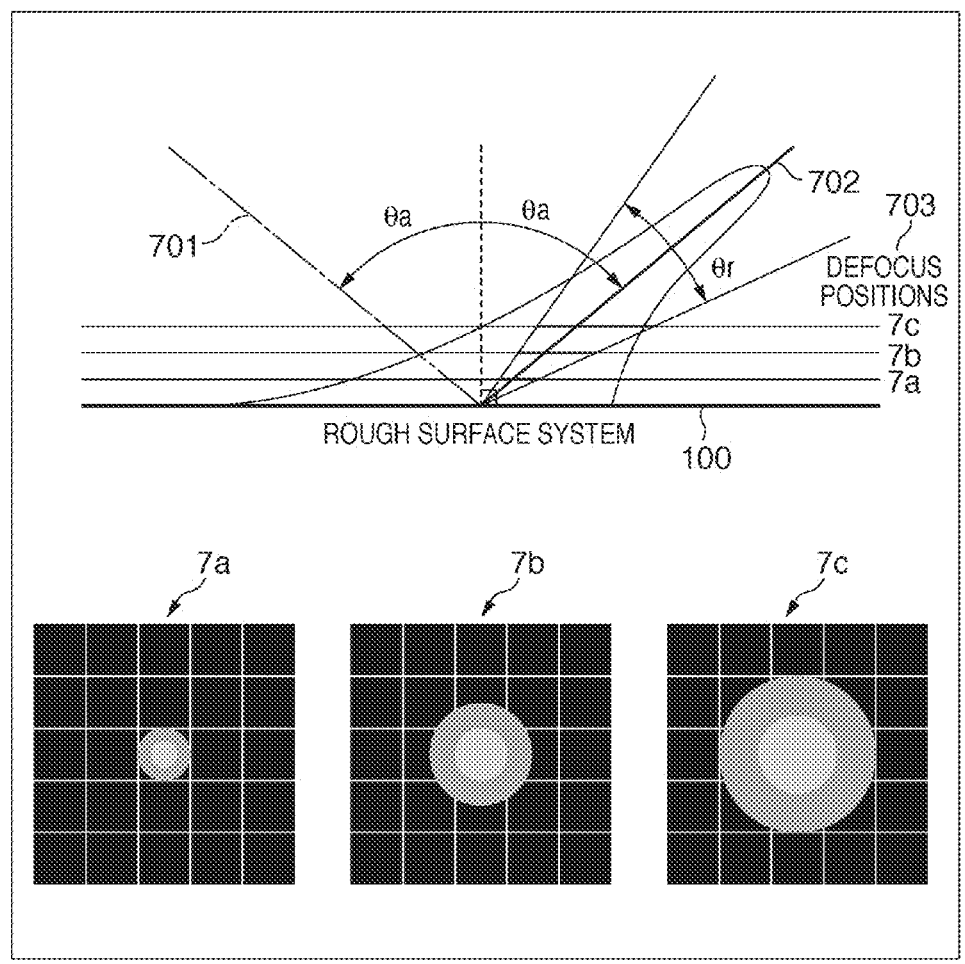
FIG. 7 is a view for explaining the other method of extracting information about the scattering characteristic.

FIG. 7 is a view exemplifying the relationship between pattern light and the reflected light, and the results of receiving the reflected light when the measurement target 100 is a rough surface system. Pattern light (dot pattern light) 701 with which the illumination unit 110 irradiates the measurement target 100 at the incident angle θa is received by the reflected light measurement unit 120 as light 702 reflected at the reflection angle θa.

When the reflected light measurement unit 120 receives the reflected light 702 while the surface of the measurement target 100 is in focus, the dot diameter of a sensed image is almost equal to the diameter of the emitted dot pattern light. To the contrary, a plurality of focus positions 7a to 7c are set as defocus positions 703 in the reflection direction of the reflected light 702. The reflected light 702 is received at each defocus position. In this case, light scatters in a wider region at a position where the defocus amount is larger. The dot diameter of the sensed image becomes larger sequentially from 7a to 7c, as represented on the lower part of the sheet surface of FIG. 7.

Figure 8:
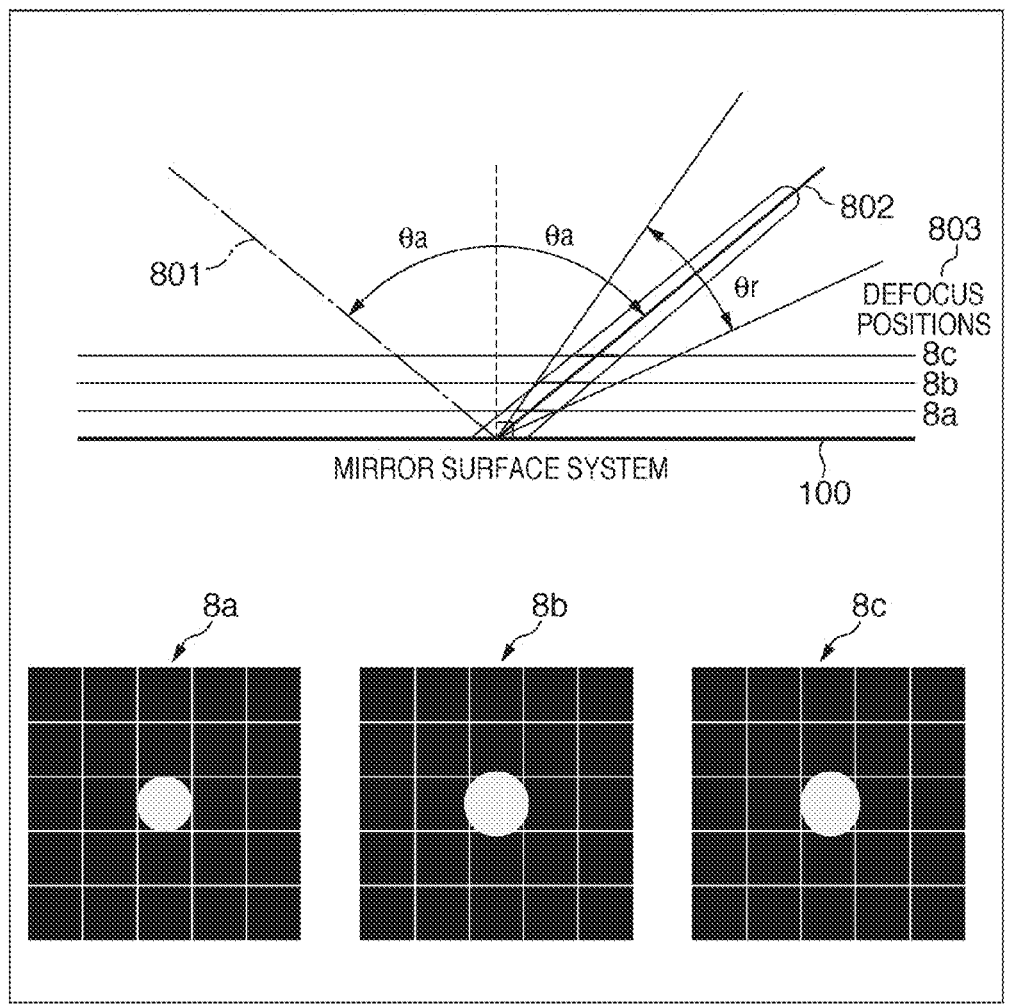
FIG. 8 is a view for explaining the other method of extracting information about the scattering characteristic.

FIG. 8 is a view exemplifying the relationship between pattern light and the reflected light, and the results of receiving the reflected light when the measurement target 100 is a mirror surface system. Dot pattern light 801 with which the illumination unit 110 irradiates the measurement target 100 at the incident angle θa is received by the reflected light measurement unit 120 as light 802 reflected at the reflection angle θa.

When the reflected light measurement unit 120 receives the reflected light 802 while the surface of the measurement target 100 is in focus, the dot diameter of a sensed image is almost equal to the diameter of the emitted dot pattern light. Further, a plurality of focus positions 8a to 8c are set as defocus positions 803 in the reflection direction of the reflected light 802. The reflected light 802 is received at each defocus position. Even in this case, light does not scatter because it has almost no scattering component. The dot diameter of the sensed image is slightly larger at 8a than at 8b, but is almost equal between 8b and 8c, as represented on the lower part of the sheet surface of FIG. 8.

As described above, when dot pattern light is emitted and the reflected light is received at a plurality of defocus positions, the spread of the dot at each defocus position changes depending on the surface state of the measurement target 100.

Thus, the reflected light extraction unit 130 in the measurement system according to the first embodiment extracts information about the scattering characteristic by, for example, comparing dot diameters at a plurality of defocus positions to calculate the enlargement ratio.

<5. Method of Extracting Information about Surface Shape>

Figure 9:
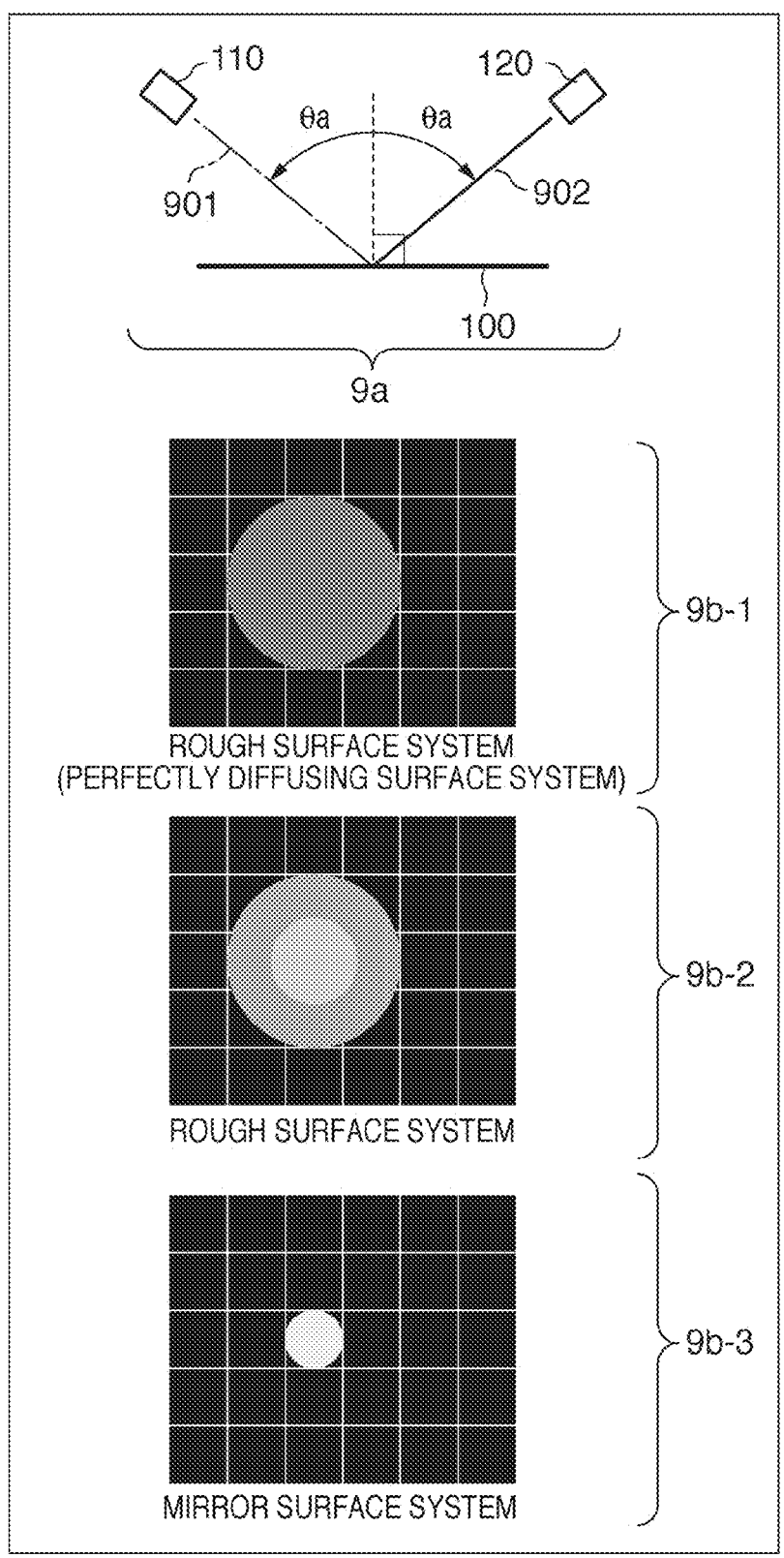
FIG. 9 is a view for explaining a method of extracting information about the surface shape.

A surface shape measurement method in the measurement system according to the first embodiment will be explained. FIG. 9 is a view for explaining a method of measuring a surface shape when the surface of the measurement target 100 is flat.

Pattern light (dot pattern light) 901 which irradiates the measurement target 100 at the incident angle θa is received by the reflected light measurement unit 120 as light 902 reflected at the reflection angle θa. The dots of images respectively sensed when the measurement target 100 is a perfectly diffusing surface system, rough surface system, and mirror surface system are shown in 9b-1 to 9b-3 on the lower part of the sheet surface of FIG. 9. These images are identical to those described with reference to FIGS. 3 to 5.

Figure 10:
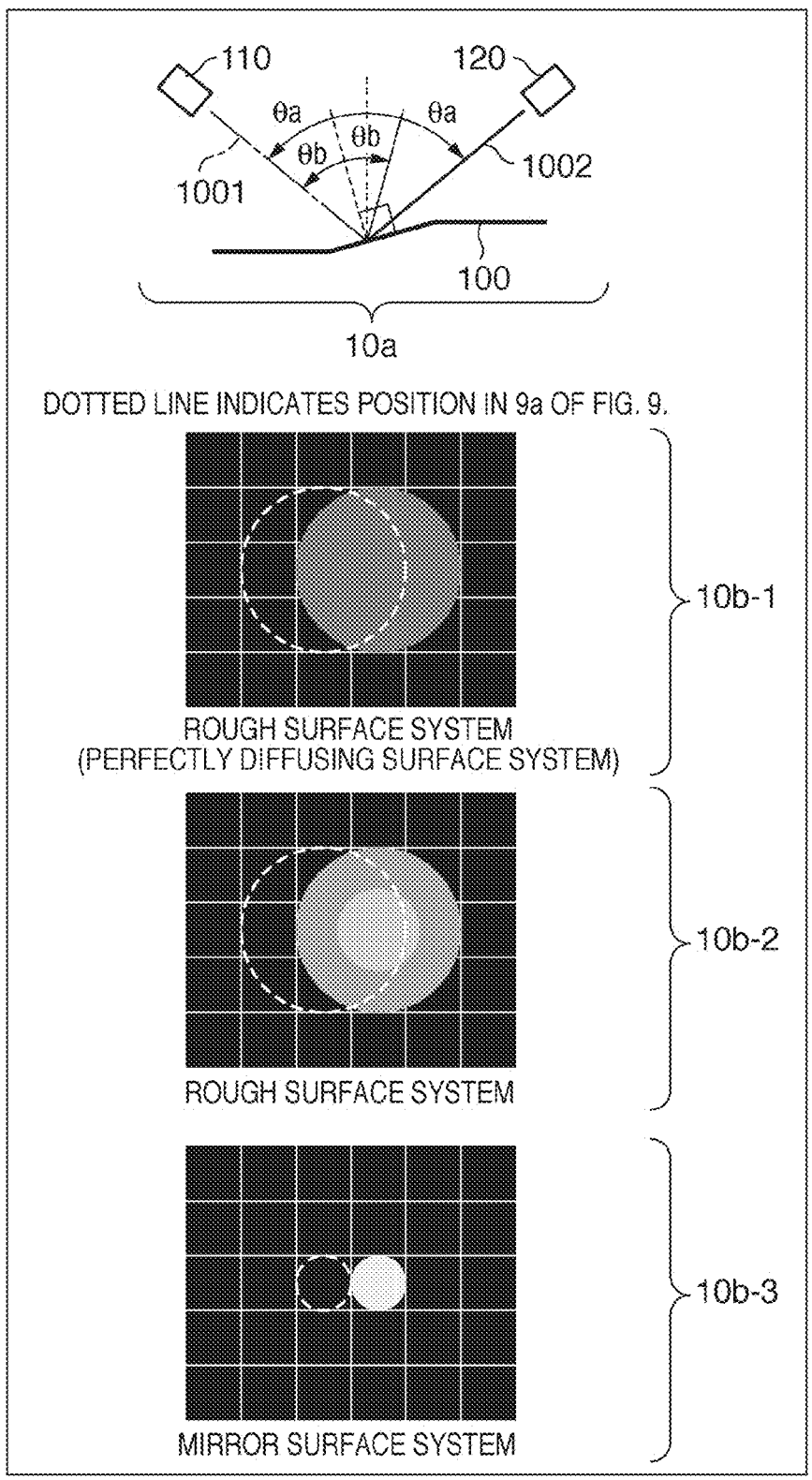
FIG. 10 is a view for explaining the method of extracting information about the surface shape.
Figure 11:
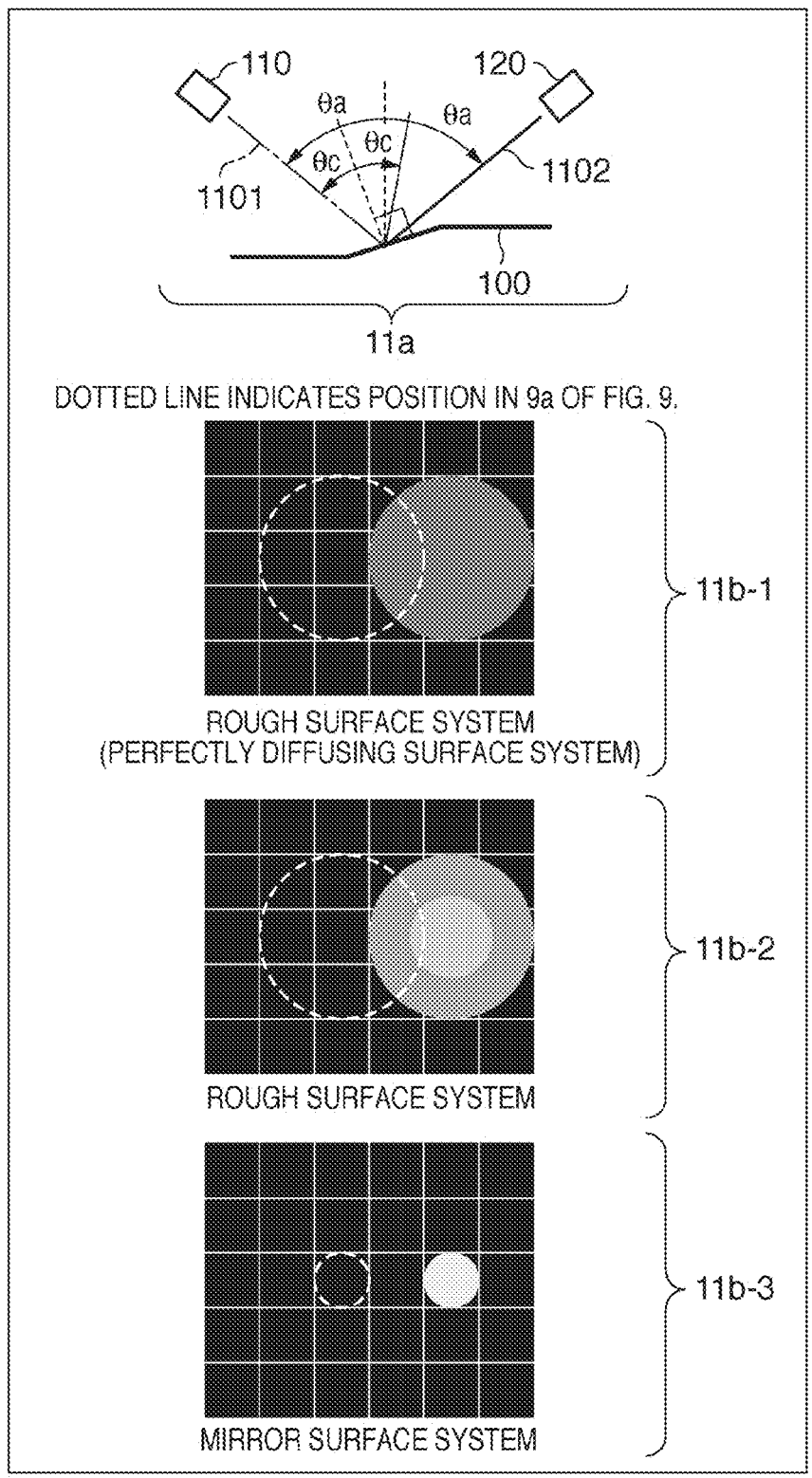
FIG. 11 is a view for explaining the method of extracting information about the surface shape.

FIGS. 10 and 11 are views for explaining a method of measuring a surface shape when the surface of the measurement target 100 is inclined. Pattern light (dot pattern light) 1001 and pattern light (dot pattern light) 1101 which irradiate the measurement target 100 at the incident angle θa are received as light 1002 and light 1102 reflected at the reflection angle θa. The dots of images respectively sensed when the measurement target 100 is a perfectly diffusing surface system, rough surface system, and mirror surface system are shown in 10b-1 to 10b-3 and 11b-1 to 11b-3 on the lower parts of the sheet surfaces of FIGS. 10 and 11.

The dot position (light receiving position) in an image sensed when the surface of the measurement target 100 is flat is defined as a reference position. If the surface of the measurement target 100 is inclined, the dot position shifts from the reference position in accordance with the magnitude of a change of the inclination. That is, the positional shift amount shown in FIG. 11 is larger than that shown in FIG. 10. This positional shift amount is measured successively for the entire measurement target 100. The positional shift amount is converted into an inclination angle, thereby measuring the surface shape. For example, the correlation between the positional shift amount and the inclination angle is measured in advance. Based on the correlation, the positional shift amount is converted into an inclination angle, extracting information about the surface shape of the measurement target.

As is apparent from the above description, in the measurement system according to the first embodiment, the measurement target is scanned with dot pattern light. Reflected light of the dot pattern light is received in the specular reflection direction at each scan position.

The dot position (light receiving position) in an image sensed when the surface of the measurement target is flat is defined as a reference position. The positional shift amount of the dot at each scan position of the measurement target is measured. Based on the measured positional shift amount, the inclination at each scan position is calculated, measuring the surface shape of the measurement target.

At this time, feature amounts such as the dot diameter in an image sensed at each scan position, the maximum, minimum, and average luminance values within the dot, variations of the luminance value within the dot, and the luminance profile are extracted as information about the scattering characteristic.

Further, the enlargement ratio of the dot diameter in images sensed at a plurality of defocus positions with respect to each scan position irradiated with dot pattern light is extracted as information about the scattering characteristic.

By scanning a measurement target with dot pattern light, information about the surface shape of the measurement target and that about the scattering characteristic can be extracted simultaneously.

Second Embodiment

In the first embodiment, the measurement target is scanned with predetermined dot pattern light, but the present invention is not limited to this. It is also possible to, for example, irradiate a measurement target simultaneously with a plurality of dot pattern light beams and receive the reflected light beams simultaneously by the reflected light measurement unit.

In this case, however, adjacent dots may overlap each other in a sensed image depending on the surface state of the measurement target, failing to measure the dot diameter. To prevent this, the second embodiment will explain an arrangement in which the interval between dot pattern light beams is controlled in accordance with the surface state of a measurement target.

<1. Configuration of Measurement System>

Figure 12:
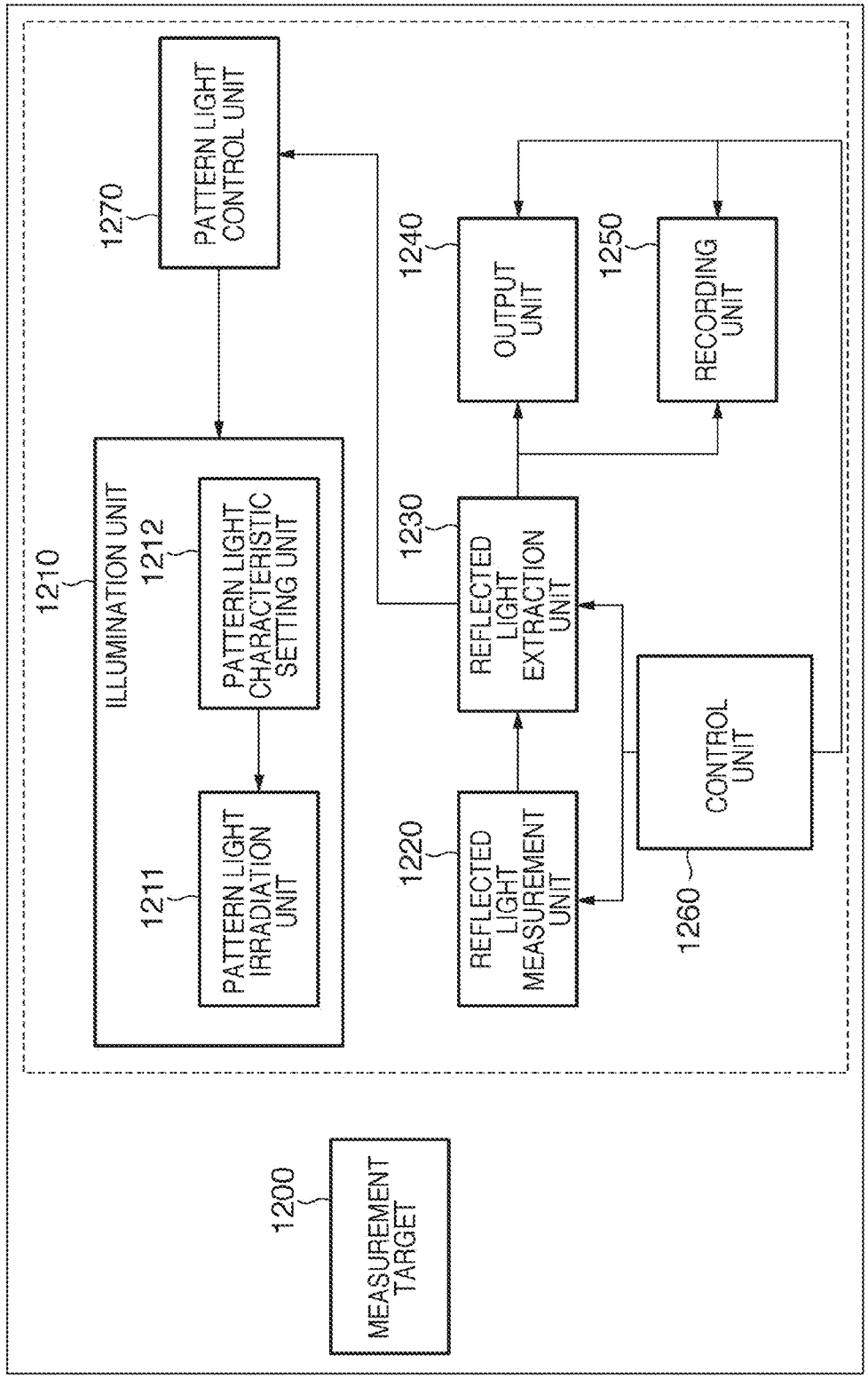
FIG. 12 is a block diagram showing the configuration of a measurement system.

FIG. 12 is a block diagram showing the configuration of a measurement system capable of measuring the surface shape and scattering characteristic of a measurement target by the pattern projection method, and controlling dot pattern light in accordance with the surface state of the measurement target according to the second embodiment of the present invention.

Note that the configuration of the measurement system is almost the same as that of the measurement system in FIG. 1 described in the first embodiment, and only a difference will be explained. A method of extracting information about the scattering characteristic of a measurement target is same as that described in the first embodiment, and a description thereof will not be repeated.

A measurement target 1200, illumination unit 1210, pattern light irradiation unit 1211, pattern light characteristic setting unit 1212, reflected light measurement unit 1220, reflected light extraction unit 1230, output unit 1240, and recording unit 1250 correspond to reference numerals 100, 110, 111, 112, 120, 130, 140, and 150 in FIG. 1, and a detailed description thereof will not be repeated. In the second embodiment, the illumination unit 1210 simultaneously emits a plurality of dot pattern light beams (details of which will be described later).

A control unit 1260 controls the operations of the reflected light measurement unit 1220, reflected light extraction unit 1230, output unit 1240, and recording unit 1250. The control unit 1260 includes a CPU, a RAM, and a ROM which stores various control programs.

The control programs stored in the ROM include a control program for controlling the reflected light measurement unit 1220, and a control program for controlling the reflected light extraction unit 1230.

The control programs also include a control program for controlling the output unit 1240, and a control program for controlling the recording unit 1250.

A pattern light control unit 1270 controls the characteristics of dot pattern light emitted by the illumination unit 1210, based on information about the scattering characteristic of the measurement target 1200 that is extracted by the reflected light extraction unit 1230. A method of controlling the characteristics of dot pattern light will be described later.

The pattern light control unit 1270 is a control unit having a single function, but may be incorporated in the control unit 1260 as one function of the control unit 1260.

The configuration of the measurement system according to the second embodiment has been described. Note that the configuration of the measurement system is not limited to this. For example, some of the blocks shown in FIG. 12 may be replaced with a general personal computer or the like.

<2. Sequence of Measurement Processing in Measurement System>

Figure 13:
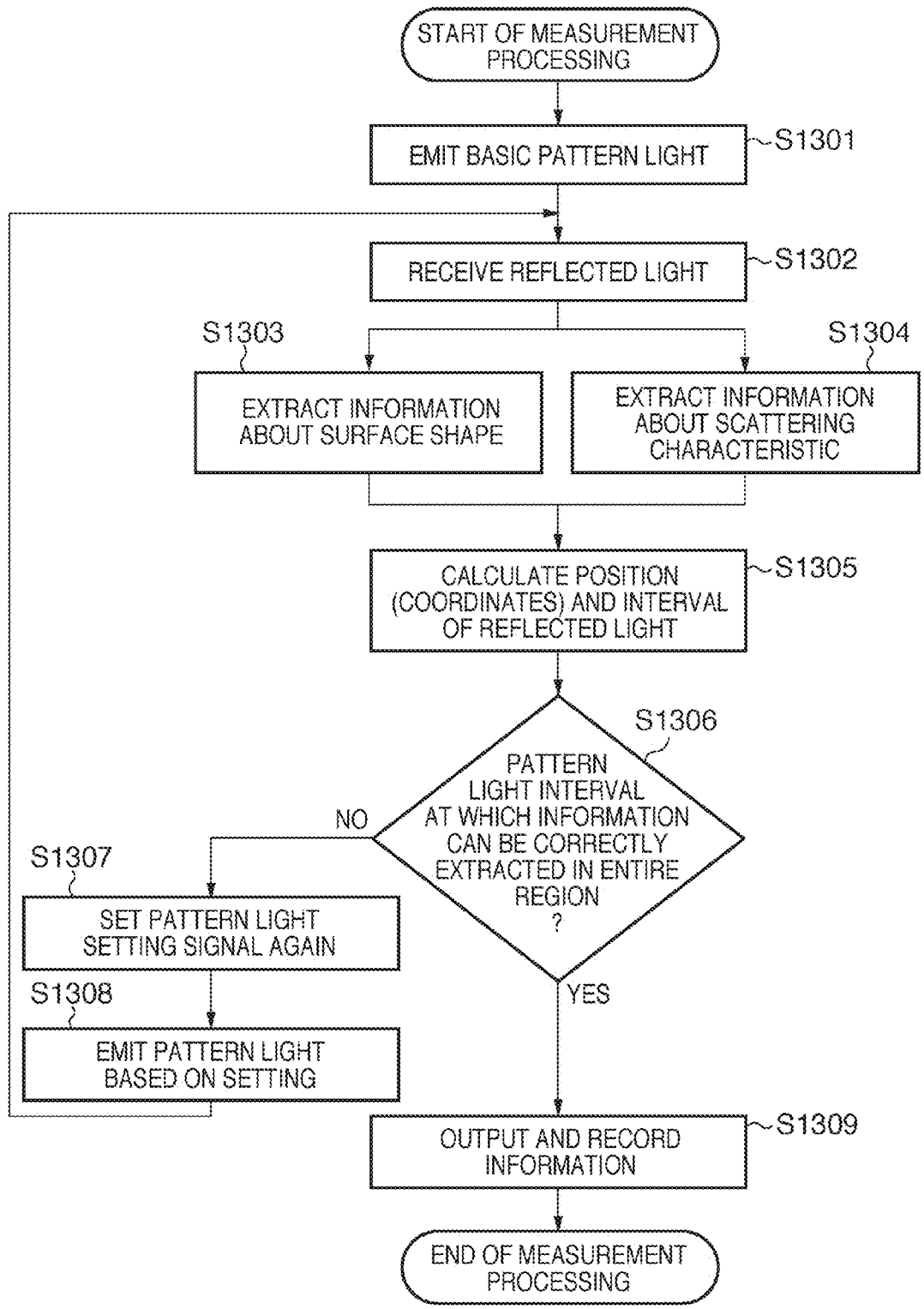
FIG. 13 is a flowchart showing the sequence of measurement processing in the measurement system.

FIG. 13 is a flowchart showing the sequence of measurement processing in the measurement system according to the second embodiment. The sequence of measurement processing in the measurement system according to the second embodiment will be explained with reference to FIG. 13.

When a measurement processing start instruction is input, the control unit 1260 sends a basic pattern light setting signal to the illumination unit 1210 in step S1301. The illumination unit 1210 irradiates the measurement target 1200 with basic pattern light based on the basic pattern light setting signal.

Note that basic pattern light based on the basic pattern light setting signal suffices to have a dot pattern light interval at which adjacent dots in an image sensed by the reflected light measurement unit 1220 can be separated when, for example, the surface shape of the measurement target 1200 is flat. The interval at which dots can be separated is one at which the outer edges of dots are in contact with each other.

In step S1302, the control unit 1260 instructs the reflected light measurement unit 1220 to receive the light reflected by the measurement target 1200. Then, the reflected light measurement unit 1220 receives the reflected light of the dot pattern light which has irradiated the measurement target 1200.

In step S1303, the reflected light extraction unit 1230 functions as a surface shape extraction unit (first extraction unit), and extracts information about the surface shape of the measurement target 1200, based on the reflected light received by the reflected light measurement unit 1220.

In step S1304, the reflected light extraction unit 1230 functions as a scattering characteristic extraction unit (second extraction unit), and extracts information about the scattering characteristic of the measurement target 1200, based on the reflected light received by the reflected light measurement unit 1220.

In step S1305, the reflected light extraction unit 1230 functions as a scattering characteristic extraction unit, and calculates the dot position (coordinates) and dot interval (distance), based on the reflected light received by the reflected light measurement unit 1220.

In step S1306, the reflected light extraction unit 1230 or control unit 1260 functions as a determination unit. More specifically, it is determined whether the dot pattern light interval is one at which information about the surface shape of the measurement target 1200 and information about the scattering characteristic of the measurement target 1200 that have been extracted by the reflected light extraction unit 1230 can be correctly extracted in the entire region of the measurement target 1200. If it is determined that the dot pattern light interval is one at which information about the surface shape and that about the scattering characteristic can be correctly extracted in the entire region of the measurement target 1200, the process shifts to step S1309. If it is determined that the dot pattern light interval is not one at which information about the surface shape and that about the scattering characteristic can be correctly extracted in the entire region of the measurement target 1200, the process shifts to step S1307.

In step S1307, the pattern light control unit 1270 sends another pattern light setting signal to the illumination unit 1210, thereby setting again the pattern light setting signal. Note that another pattern light setting signal is a pattern light setting signal for setting dot pattern light irradiating the measurement target 1200 to have an interval at which information about the surface shape and that about the scattering characteristic can be correctly extracted in the entire region of the measurement target 1200.

In step S1308, the illumination unit 1210 irradiates the measurement target 1200 with dot pattern light based on the reset pattern light setting signal. After irradiation, the process returns to step S1302.

In step S1309, based on an instruction from the control unit 1260, the pieces of information about the surface shape and scattering characteristic of the measurement target 1200 are output by the output unit 1240 and recorded by the recording unit 1250 as measurement results. The output unit 1240 displays, as measurement results on the monitor or the like, the pieces of information about the surface shape and scattering characteristic of the measurement target 1200. The recording unit 1250 stores, as digital data of the measurement results in a storage device such as a hard disk or flash memory, the pieces of information about the surface shape and scattering characteristic of the measurement target 1200.

<3. Detailed Arrangement of Illumination Unit>

The detailed arrangement of the illumination unit 1210 capable of irradiating the measurement target 1200 simultaneously with a plurality of dot pattern light beams will be explained. FIG. 14 is a view exemplifying a liquid crystal projector used as the illumination unit 1210 capable of irradiating the measurement target 1200 simultaneously with a plurality of dot pattern light beams.

In the liquid crystal projector, its resolution determines the size and interval of minimum irradiatable dot pattern light. When the liquid crystal projector is used, the diameter and interval of dot pattern light can be changed within the range of the resolution. In the example of FIG. 14, one dot pattern light corresponds to a resolution of four pixels of the liquid crystal projector, and the dot pattern light interval is four pixels.

<4. Dot Pattern Light Control Method>

A dot pattern light control method will be explained. As described above, the pattern light control unit 1270 in the measurement system according to the second embodiment controls dot pattern light emitted by the illumination unit 1210 based on information about the scattering characteristic of the measurement target 1200.

To extract the scattering characteristic of the surface of a measurement target at high precision, dot pattern light beams are desirably emitted to form dots in a sensed image as densely as possible. However, if dots are formed excessively densely, adjacent dots overlap each other and cannot be separated. It is therefore necessary to emit dot pattern light beams at an interval at which dots do not overlap each other.

Figure 15:
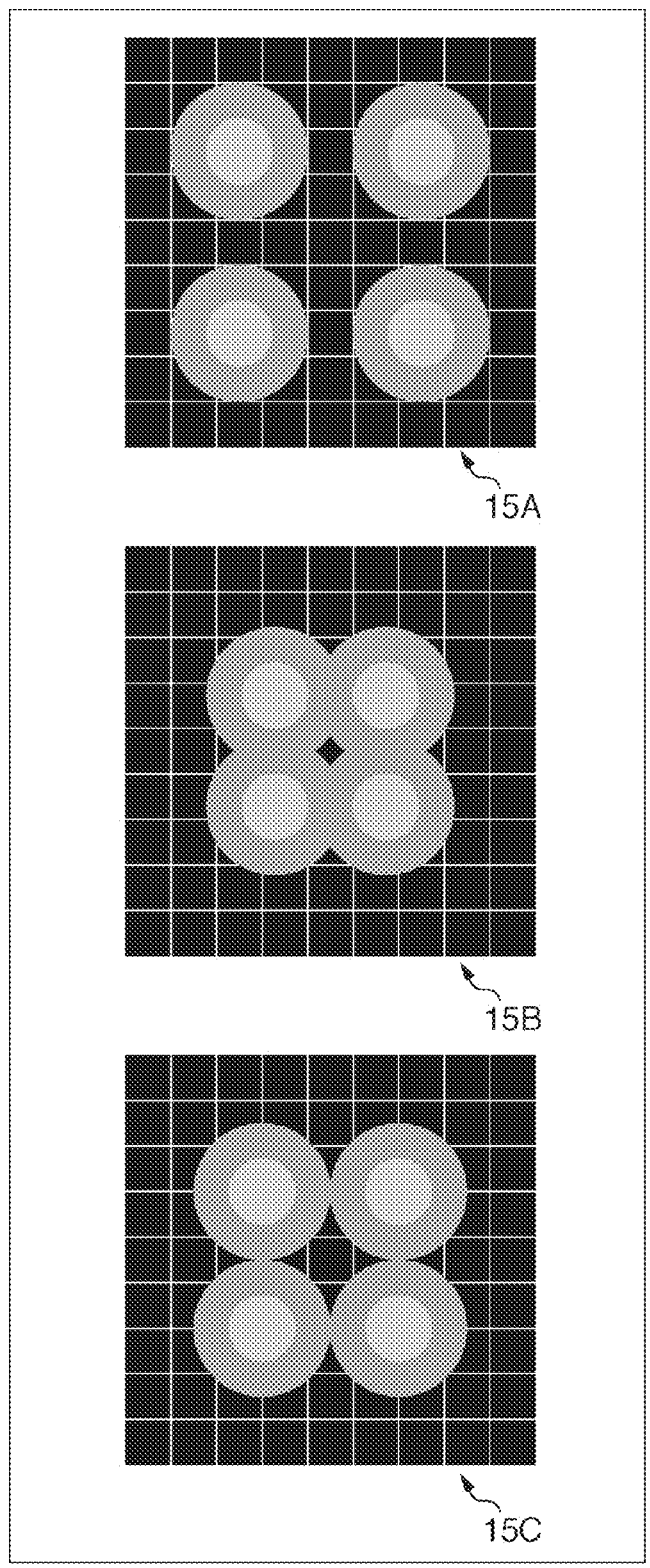
FIG. 15 is a view for explaining a dot pattern light control method.

FIG. 15 is a schematic view exemplifying reflected light when the measurement target is a rough surface system and irradiated with a plurality of dot pattern light beams. In an example 15A of FIG. 15, there is a gap between dots in a sensed image. To extract the scattering characteristic at high precision, the interval between dot pattern light beams is desirably controlled to narrow the dot interval. In an example 15B of FIG. 15, dots overlap each other, so the interval between dot pattern light beams needs to be controlled to widen the dot interval.

In contrast, in an example 15C of FIG. 15, there is no gap between dots, and the circumferences (outer edges) of dots are in contact with each other so as to be able to separate the dots, and thus this dot interval is optimum. That is, when the measurement target is a rough surface system, the pattern light control unit 1270 controls the interval between dot pattern light beams to have a dot interval as shown in 15C of FIG. 15. Also when the measurement target is a perfectly diffusing surface system, the pattern light control unit 1270 controls the interval between dot pattern light beams to have a similar dot interval.

Figure 16:
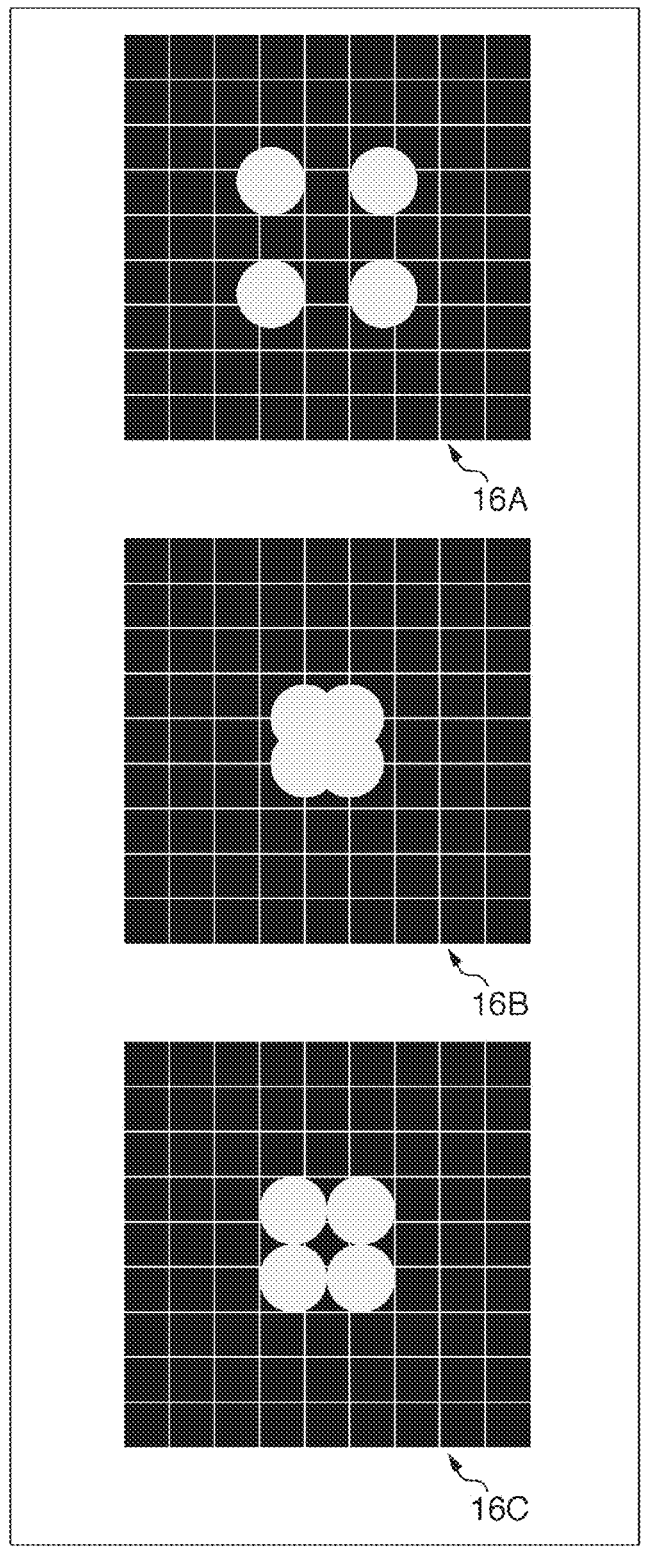
FIG. 16 is a view for explaining the dot pattern light control method.

FIG. 16 is a schematic view exemplifying reflected light when the measurement target is a mirror surface system and irradiated with a plurality of dot pattern light beams. Also in the mirror surface system, as in the rough surface system, there is a gap between dots in a sensed image in 16A of FIG. 16. To extract the scattering characteristic at high precision, the interval between dot pattern light beams is desirably controlled to narrow the dot interval. In 16B of FIG. 16, dots overlap each other, so the interval between dot pattern light beams is desirably controlled to widen the dot interval.

To the contrary, in 16C of FIG. 16, there is no gap between dots, the circumferences (outer edges) of dots are in contact with each other so as to be able to separate the dots, and this dot interval is optimum. That is, when the measurement target is a mirror surface system, the pattern light control unit 1270 controls the interval between dot pattern light beams to have a dot interval as shown in 16C of FIG. 16.

In this manner, the interval between dot pattern light beams is changed depending on whether the measurement target is a rough surface system or mirror surface system. The measurement system according to the second embodiment can extract the scattering characteristic of the measurement target at high precision.

As is apparent from the above description, the measurement system according to the second embodiment further includes the pattern light control unit which controls the interval between dot pattern light beams, based on information about the extracted scattering characteristic, in addition to the measurement system according to the first embodiment.

The measurement system according to the second embodiment can extract the scattering characteristic of a measurement target at high precision regardless of the surface state of the measurement target.

Figure 17:
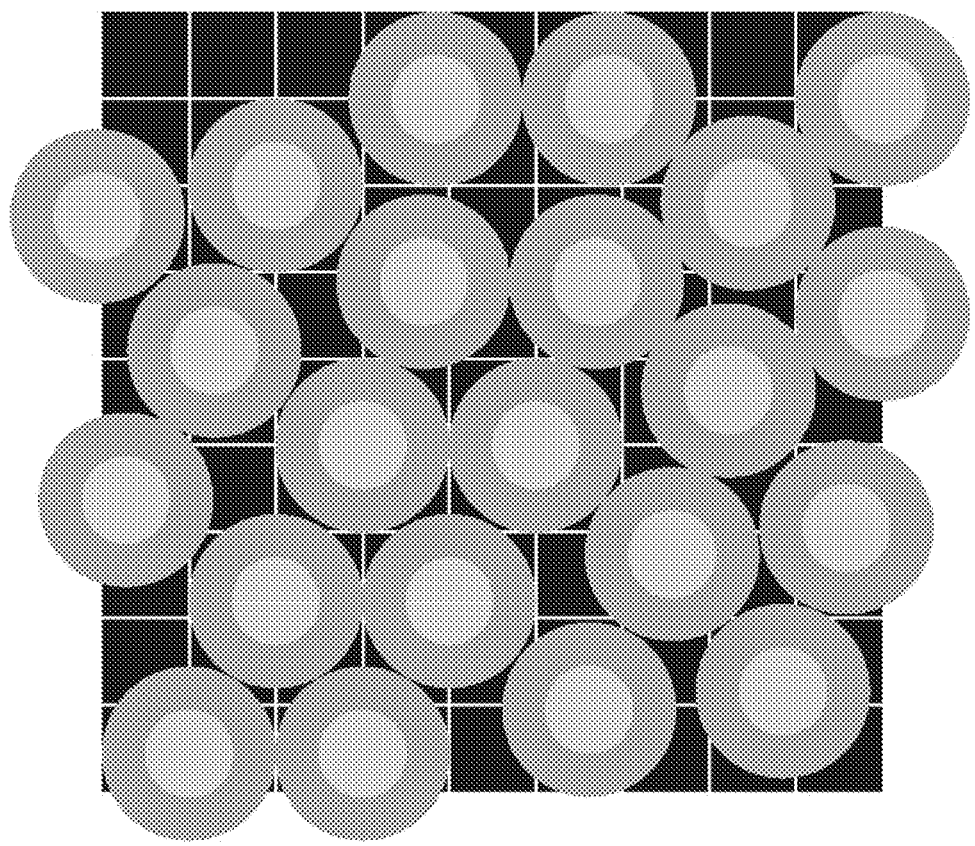
FIG. 17 is a view for explaining the dot pattern light control method.

In the examples of FIGS. 15 and 16 described in the second embodiment, dots are regularly arranged in the horizontal and vertical directions. However, the present invention is not limited to this. For example, the pattern light control unit controls the interval between dot pattern light beams so that even irregular dots having no periodicity do not overlap each other without any gap. FIG. 17 is a view exemplifying dots when the interval between dot pattern light beams is controlled so that irregular dots having no periodicity do not overlap each other without any gap.

In the second embodiment, an optimum dot interval is an interval at which there is no gap between dots and the outer edges of dots are in contact with each other so as to be able to separate the dots. However, the definition of the optimum dot interval is not limited to this.

Figure 18:
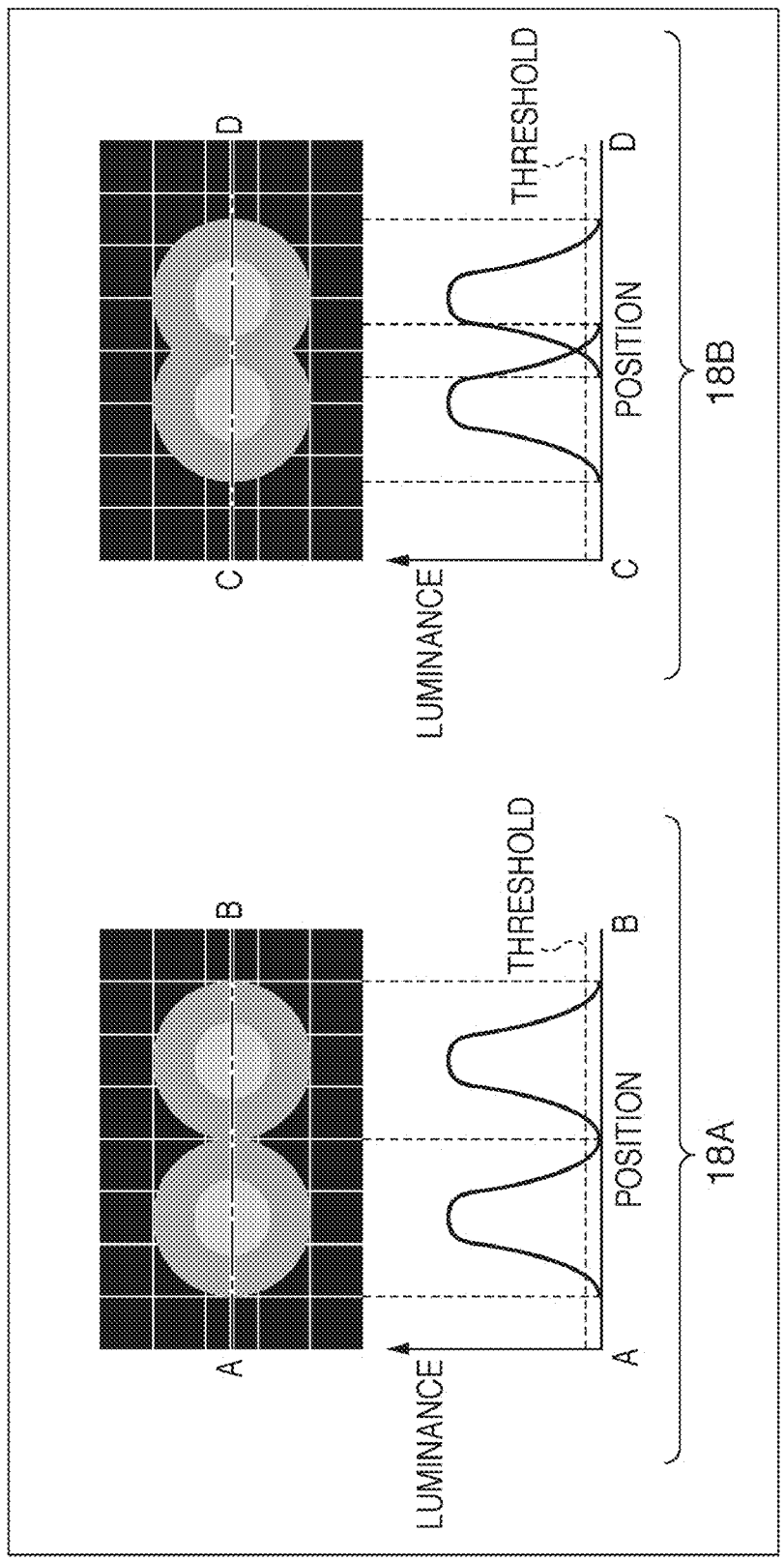
FIG. 18 is a view for explaining the definition of the outer edge of a dot.

For example, as shown in FIG. 18, an optimum dot interval may be defined based on a luminance profile on a straight line AB or CD passing through the coordinates of the maximum luminance values of adjacent dots. More specifically, an optimum dot interval may be defined based on whether a pixel having a luminance value equal to or smaller than a predetermined threshold exists at a portion where the luminance profiles of respective dots overlap each other on the straight line AB or CD.

In 18A of FIG. 18, a plurality of pixels each having a luminance value equal to or smaller than the predetermined threshold exist at a portion where the luminance profiles of respective dots overlap each other on the straight line AB. It is determined that the dot interval is wide. In 18B of FIG. 18, a pixel having a luminance value equal to or smaller than the predetermined threshold does not exist at a portion where the luminance profiles of respective dots overlap each other on the straight line CD. Thus, it is determined that the dot interval is narrow.

In the second embodiment, a plurality of dot pattern light beams have the same size, but the present invention is not limited to this. The same control is executed even when a plurality of dot pattern light beams have different sizes.

Figure 19:
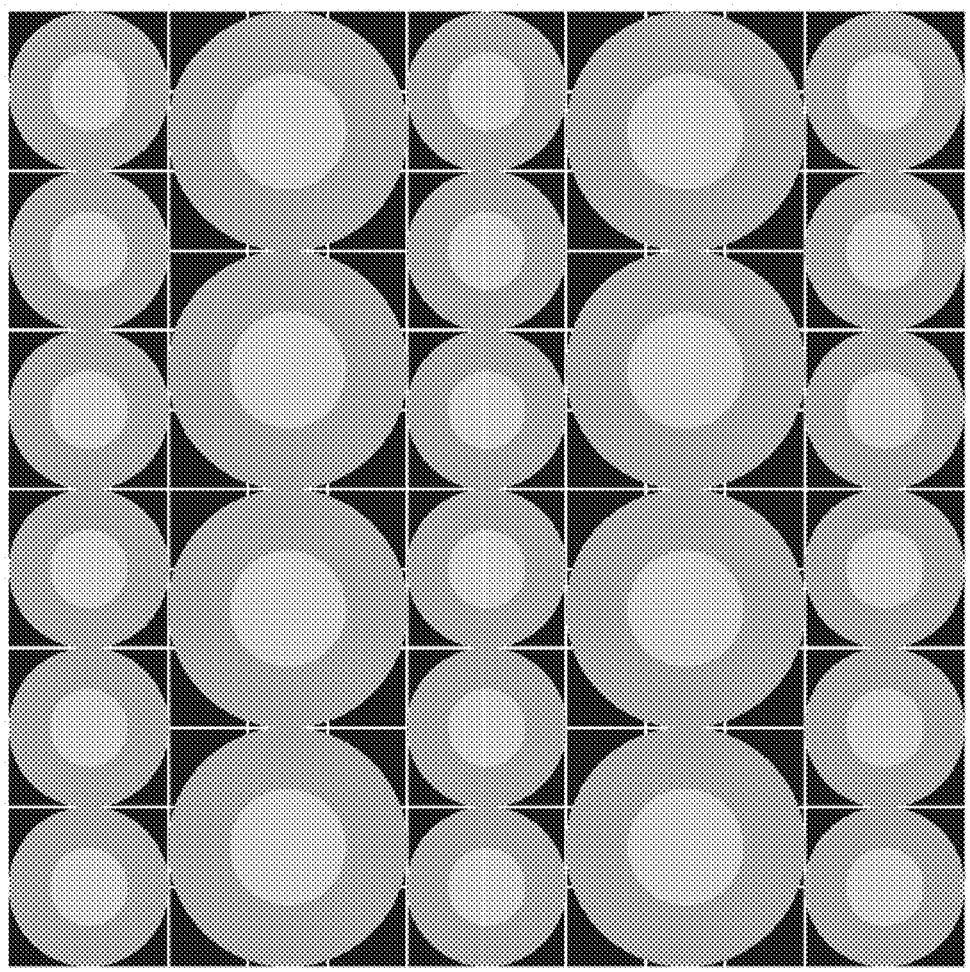
FIG. 19 is a view for explaining a dot pattern light control method.

FIG. 19 is a view showing a state in which the interval between dot pattern light beams is controlled to have an optimum dot interval upon emitting a plurality of dot pattern light beams having different diameters. When dot pattern light beams include one having a large dot diameter, the measurement time can be shortened with almost no adverse effect on measurement precision in a region where the measurement target is almost flat or a region where a change of the shape is constant.

Third Embodiment

In the first embodiment, dot pattern light is used as irradiation pattern light. However, the present invention is not limited to this and may use, for example, stripe pattern light.

A measurement system which measures the surface shape and scattering characteristic of a measurement target using stripe pattern light as irradiation pattern light will be explained. Note that the configuration of the measurement system and the sequence of measurement processing according to the third embodiment are the same as those in FIGS. 1 and 2 described in the first embodiment, so a description thereof will not be repeated.

<1. Method (1) of Extracting Information about Scattering Characteristic>

A method of extracting information about the scattering characteristic will be explained. First, the relationship between the surface state of the measurement target and reflected light upon emitting stripe pattern light will be explained.

Figure 20:
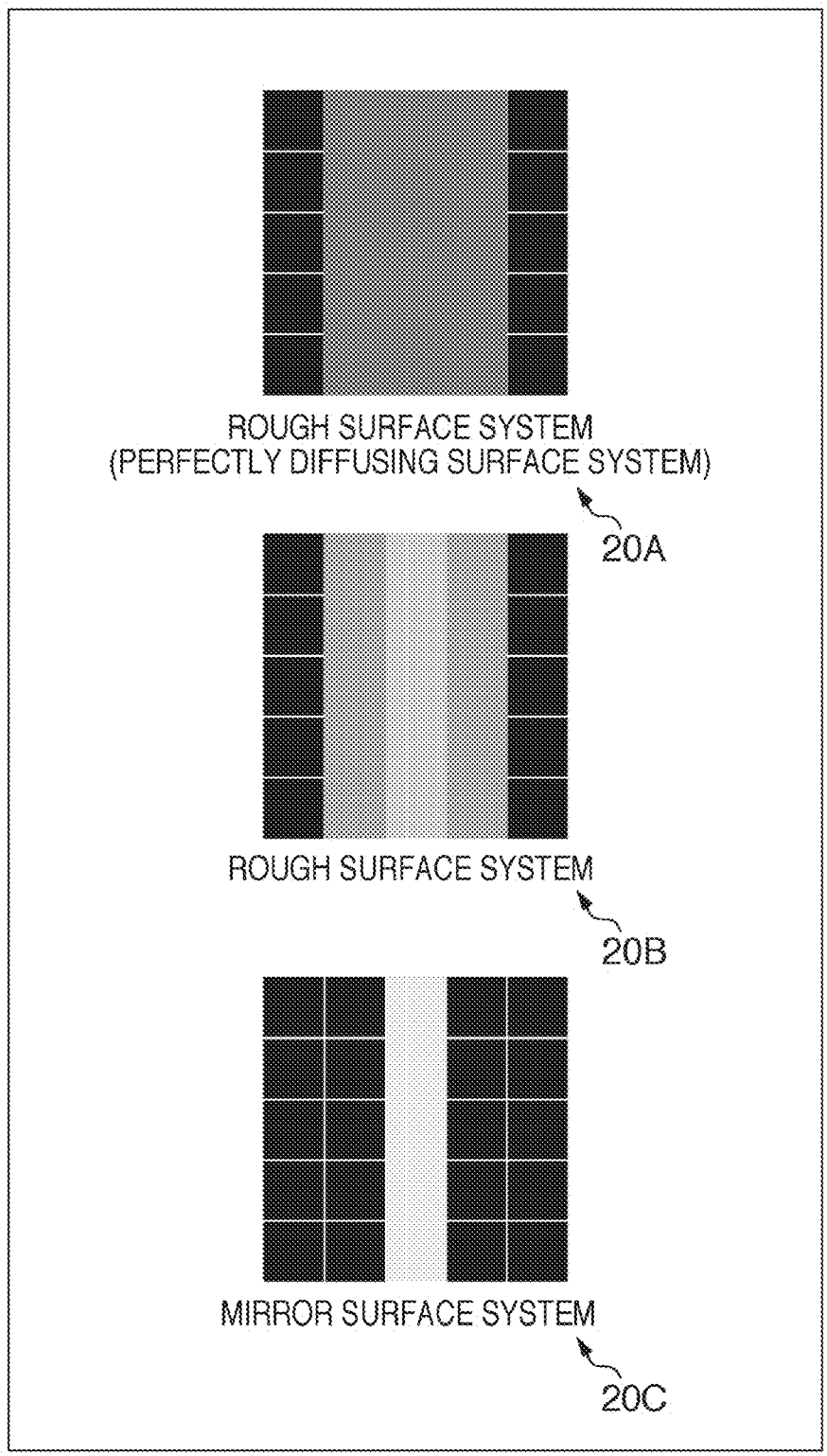
FIG. 20 is a view for explaining a method of extracting information about the scattering characteristic.

20A of FIG. 20 exemplifies the result of receiving reflected light by a reflected light measurement unit 120 when a measurement target 100 is a perfectly diffusing surface system and an illumination unit 110 irradiates the measurement target 100 with stripe pattern light. In FIG. 20, one grid corresponds to one photosensor which receives reflected light.

As shown in 20A of FIG. 20, when the measurement target 100 is a perfectly diffusing surface system, the scattering characteristic is dominant in reflected light. A sensed image is a slightly broadened stripe having uniform brightness as a whole.

20B of FIG. 20 exemplifies the result of receiving reflected light by the reflected light measurement unit 120 when the measurement target 100 is a rough surface system and the illumination unit 110 irradiates the measurement target 100 with stripe pattern light. As shown in 20B of FIG. 20, when the measurement target 100 is a rough surface system, the specular reflection component and scattering component coexist in reflected light. A sensed image is a slightly broadened stripe having uniform brightness as a whole and a bright line at the center.

20C of FIG. 20 exemplifies the result of receiving reflected light by the reflected light measurement unit 120 when the measurement target 100 is a mirror surface system and the illumination unit 110 irradiates the measurement target 100 with stripe pattern light. As shown in 20C of FIG. 20, when the measurement target 100 is a mirror surface system, the specular reflection component is dominant in reflected light. A sensed image is a stripe having only a bright line at the center.

As described above, when stripe pattern light is emitted, the reflected light changes in the spread and luminance distribution of the stripe depending on the surface state of the measurement target 100. From this, a reflected light extraction unit 130 in the measurement system according to the third embodiment extracts, as information about the scattering characteristic, feature amounts such as the stripe width, the maximum, minimum, and average luminance values within the stripe, variations of the luminance value within the stripe, and the luminance profile.

<2. Method (2) of Extracting Information about Scattering Characteristic>

Next, another method of extracting information about the scattering characteristic by the reflected light extraction unit 130 in the measurement system according to the third embodiment will be described.

Figure 21:
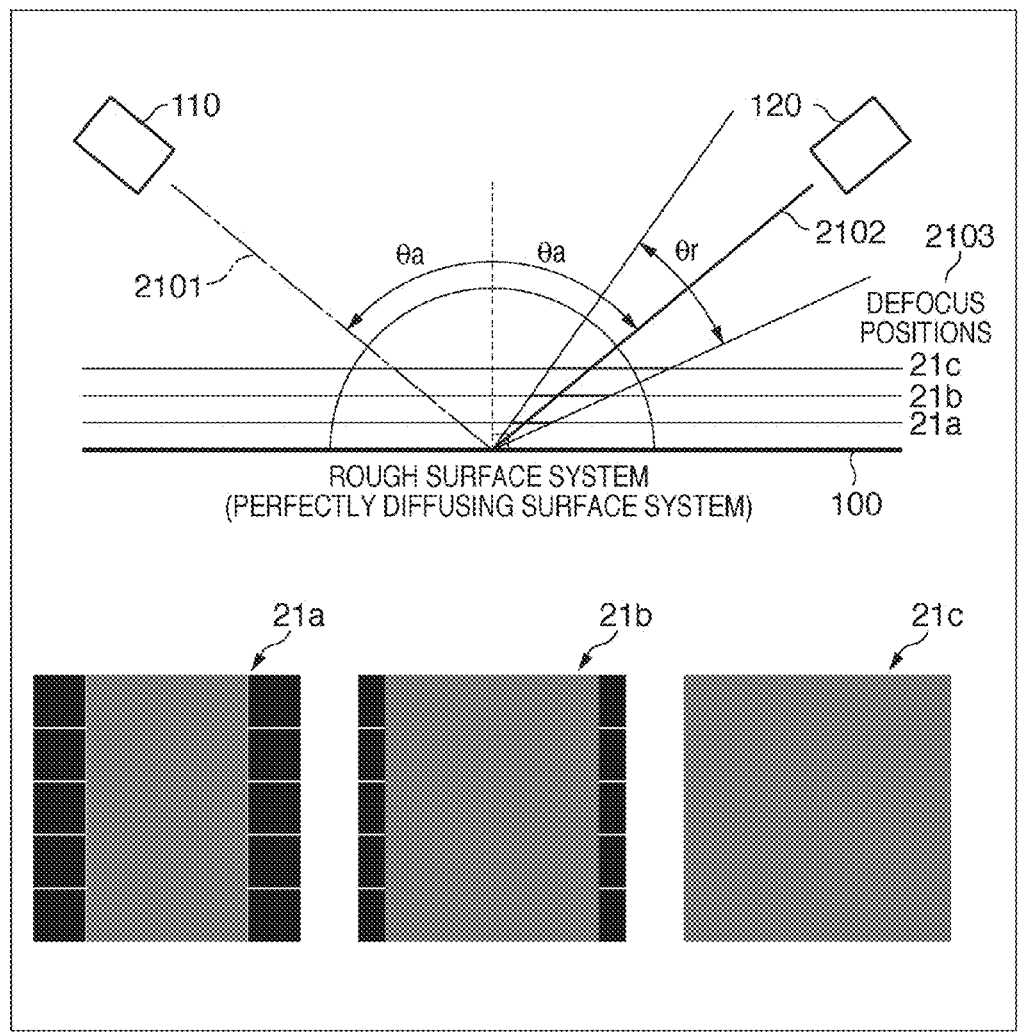
FIG. 21 is a view for explaining another method of extracting information about the scattering characteristic.

FIG. 21 is a view exemplifying the relationship between pattern light and the reflected light when the measurement target 100 is a perfectly diffusing surface system, and the results of receiving the reflected light. Pattern light (stripe pattern light) 2101 with which the illumination unit 110 irradiates the measurement target 100 at the incident angle $\theta a$ is received by the reflected light measurement unit 120 as light 2102 reflected at the reflection angle $\theta a$.

When the reflected light measurement unit 120 receives the reflected light 2102 while the surface of the measurement target 100 is in focus, the stripe width of a sensed image is almost equal to the width of the emitted stripe pattern light. In contrast, a plurality of focus positions 21a to 21c are set as defocus positions 2103 in the reflection direction of the reflected light 2102. The reflected light 2102 is received at each defocus position. In this case, light scatters in a wider region at a position where the defocus amount is larger. For this reason, the stripe width of the sensed image becomes larger sequentially from 21a to 21c, as represented on the lower part of the sheet surface of FIG. 21.

Figure 22:
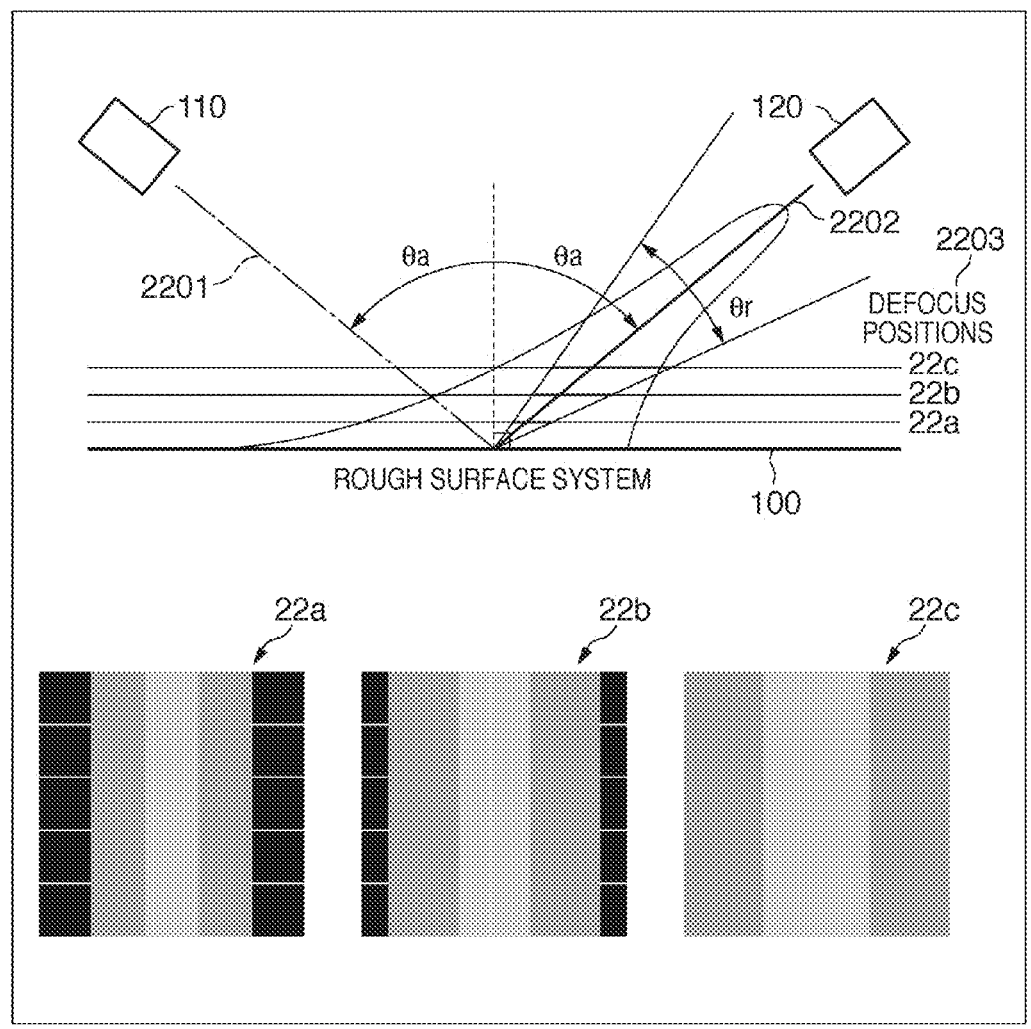
FIG. 22 is a view for explaining the other method of extracting information about the scattering characteristic.

FIG. 22 is a view exemplifying the relationship between pattern light and the reflected light when the measurement target 100 is a rough surface system, and the results of receiving the reflected light. Pattern light (stripe pattern light) 2201 with which the illumination unit 110 irradiates the measurement target 100 at the incident angle θa is received by the reflected light measurement unit 120 as light 2202 reflected at the reflection angle θa.

When the reflected light measurement unit 120 receives the reflected light 2202 while the surface of the measurement target 100 is in focus, the stripe width of a sensed image is almost equal to the width of the emitted stripe pattern light. To the contrary, a plurality of focus positions 22a to 22c are set as defocus positions 2203 in the reflection direction of the reflected light 2202. The reflected light 2202 is received at each defocus position. In this case, light scatters in a wider region at a position where the defocus amount is larger. Thus, the stripe width of the sensed image becomes larger sequentially from 22a to 22c, as represented on the lower part of the sheet surface of FIG. 22.

Figure 23:
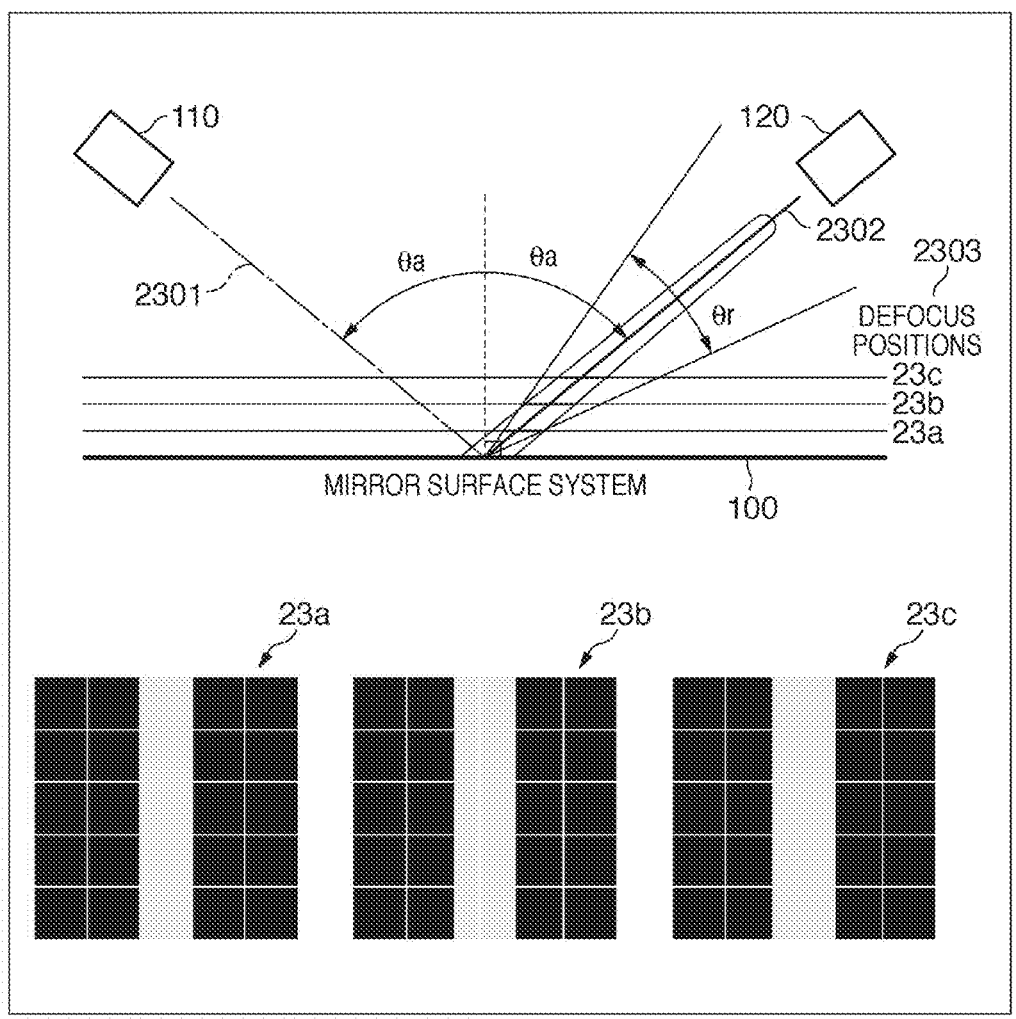
FIG. 23 is a view for explaining the other method of extracting information about the scattering characteristic.

FIG. 23 is a view exemplifying the relationship between pattern light and the reflected light when the measurement target 100 is a mirror surface system, and the results of receiving the reflected light. Pattern light 2301 (stripe pattern light) with which the illumination unit 110 irradiates the measurement target 100 at the incident angle θa is measured by the reflected light measurement unit 120 as light 2302 reflected at the reflection angle θa.

When the reflected light measurement unit 120 receives the reflected light 2302 while the surface of the measurement target 100 is in focus, the stripe width of a sensed image is almost equal to the width of the emitted stripe pattern light. Further, a plurality of focus positions 23a to 23c are set as defocus positions 2303 in the reflection direction of the reflected light 2302. The reflected light 2302 is received at each defocus position. Even in this case, light does not scatter because it has almost no scattering component. Therefore, the stripe width of the sensed image is slightly larger at 23b than at 23a, but is almost equal between 23b and 23c, as represented on the lower part of the sheet surface of FIG. 23.

As described above, when stripe pattern light is emitted and the reflected light is received at a plurality of defocus positions, the spread of the stripe at each defocus position changes depending on the surface state of the measurement target 100.

From this, the reflected light extraction unit 130 in the measurement system according to the third embodiment extracts information about the scattering characteristic by, for example, comparing stripe widths at a plurality of defocus positions to calculate the enlargement ratio.

<3. Method of Extracting Information about Surface Shape>

Figure 24:
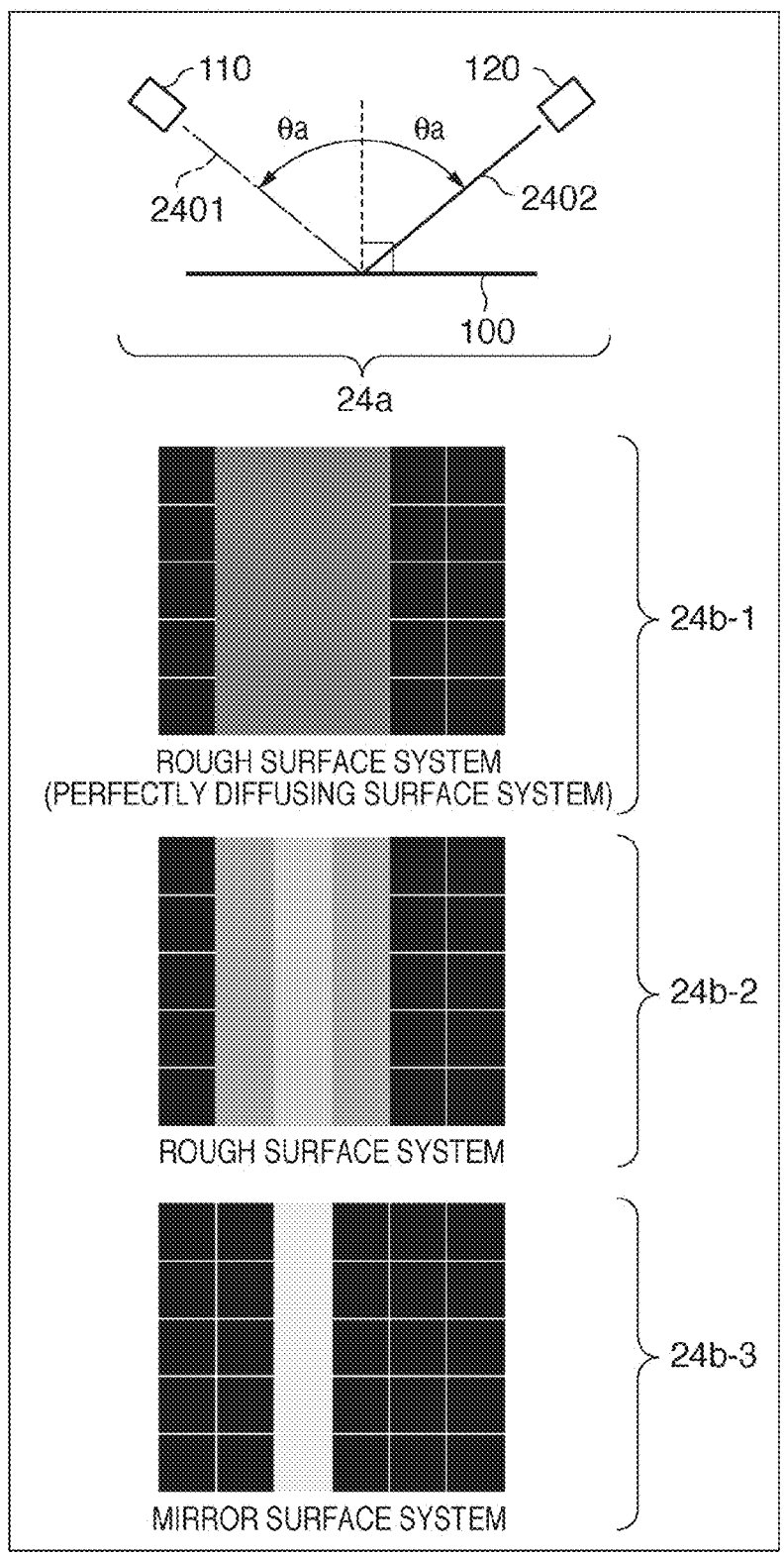
FIG. 24 is a view for explaining a method of extracting information about the surface shape.

A surface shape measurement method in the measurement system according to the third embodiment will be explained. FIG. 24 is a view for explaining a method of measuring a surface shape when the surface of the measurement target 100 is flat.

Pattern light (stripe pattern light) 2401 which irradiates the measurement target 100 at the incident angle θa is received by the reflected light measurement unit 120 as light 2402 reflected at the reflection angle θa. The stripes of images respectively sensed when the measurement target 100 is a perfectly diffusing surface system, rough surface system, and mirror surface system are shown in 24b-1 to 24b-3 on the lower part of the sheet surface of FIG. 24. These images are identical to those described with reference to FIG. 20.

Figure 25:
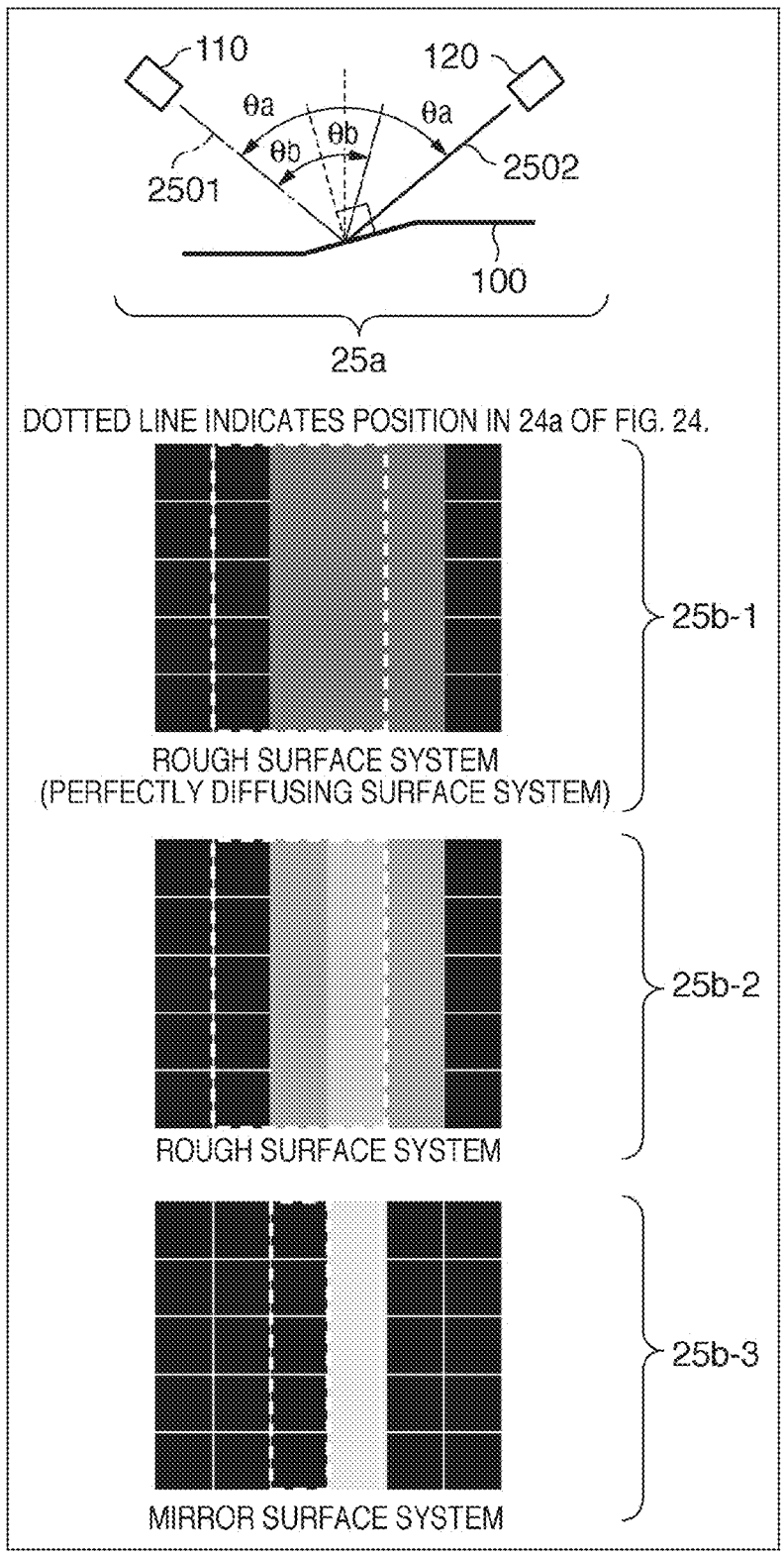
FIG. 25 is a view for explaining the method of extracting information about the surface shape.
Figure 26:
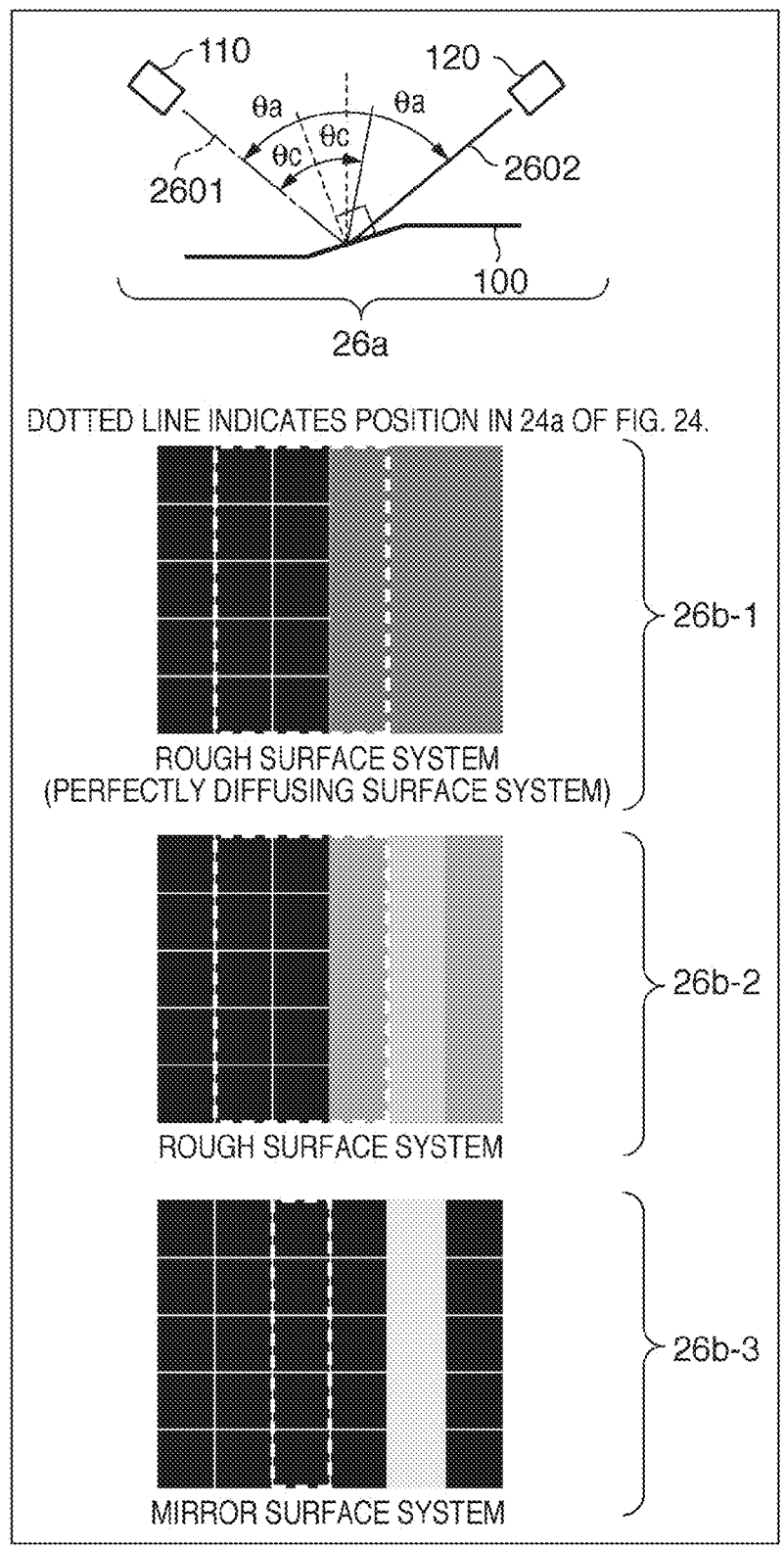
FIG. 26 is a view for explaining the method of extracting information about the surface shape.

FIGS. 25 and 26 are schematic views for explaining a method of measuring a surface shape when the surface of the measurement target 100 is inclined. Pattern light (stripe pattern light) 2501 and pattern light (stripe pattern light) 2601 which irradiate the measurement target 100 at the incident angle θa are received as light 2502 and light 2602 reflected at the reflection angle θa. The stripes of images respectively sensed when the measurement target 100 is a perfectly diffusing surface system, rough surface system, and mirror surface system are shown in 25b-1 to 25b-3 and 26b-1 to 26b-3 on the lower parts of the sheet surfaces of FIGS. 25 and 26.

The stripe position (light receiving position) in an image sensed when the surface of the measurement target 100 is flat is defined as a reference position. If the surface of the measurement target 100 is inclined, the stripe position shifts from the reference position in accordance with the magnitude of a change of the inclination. That is, the positional shift amount shown in FIG. 26 is larger than that shown in FIG. 25. This positional shift amount is measured successively for the entire measurement target 100. The positional shift amount is converted into an inclination angle, thereby measuring the surface shape. For example, the correlation between the positional shift amount and the inclination angle is measured in advance. Based on the correlation, the positional shift amount is converted into an inclination angle, extracting information about the surface shape of the measurement target.

As is apparent from the above description, in the measurement system according to the third embodiment, the measurement target is scanned with stripe pattern light. Reflected light of the stripe pattern light is received in the specular reflection direction at each scan position.

The stripe position (light receiving position) in an image sensed when the surface of the measurement target is flat is defined as a reference position. The positional shift amount of the stripe at each scan position of the measurement target is measured. Based on the measured positional shift amount, the inclination at each scan position is calculated, measuring the surface shape of the measurement target.

At this time, feature amounts such as the stripe width in an image sensed at each scan position, the maximum, minimum, and average luminance values within the stripe, variations of the luminance value within the stripe, and the luminance profile are extracted as information about the scattering characteristic.

Further, the enlargement ratio of the stripe width in images sensed at a plurality of defocus positions with respect to each scan position irradiated with stripe pattern light is extracted as information about the scattering characteristic.

By scanning a measurement target with stripe pattern light, information about the surface shape of the measurement target and that about the scattering characteristic can be extracted simultaneously.

Fourth Embodiment

In the third embodiment, the measurement target is scanned with predetermined stripe pattern light, but the present invention is not limited to this. It is also possible to, for example, irradiate a measurement target with a plurality of stripe pattern light beams and receive the reflected light beams by the reflected light measurement unit.

In this case, however, adjacent stripes may overlap each other in a sensed image depending on the surface state of the measurement target, failing to measure the stripe width. To prevent this, the fourth embodiment will explain an arrangement in which the interval between stripe pattern light beams is controlled in accordance with the surface state of a measurement target.

Note that the configuration of a measurement system and the sequence of measurement processing are the same as those in FIGS. 12 and 13 described in the second embodiment, and a description thereof will not be repeated.

Similar to the second embodiment, a pattern light control unit 1270 in the measurement system according to the fourth embodiment controls stripe pattern light emitted by an illumination unit 1210, based on information about the scattering characteristic of a measurement target 1200.

To extract the scattering characteristic of the surface of a measurement target at high precision, stripe pattern light beams are desirably emitted to form stripes in a sensed image as densely as possible. However, if stripes are formed excessively densely, adjacent stripes overlap each other and cannot be separated. It is therefore necessary to emit stripe pattern light beams at an interval at which stripes do not overlap each other.

Figure 27:
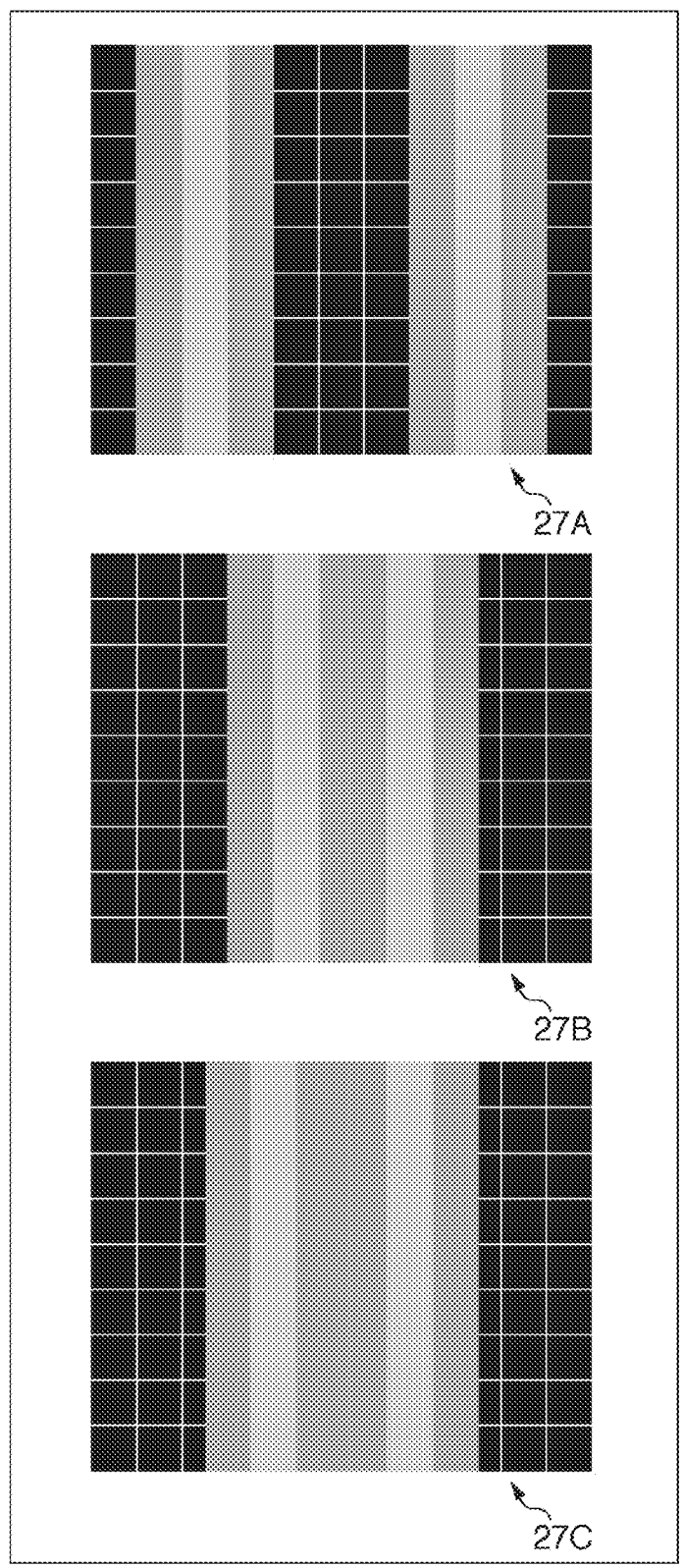
FIG. 27 is a view for explaining a stripe pattern light control method.

FIG. 27 is a schematic view exemplifying reflected light when the measurement target is a rough surface system and irradiated with a plurality of stripe pattern light beams. In an example 27A of FIG. 27, there is a gap between stripes in a sensed image. To extract the scattering characteristic at high precision, the interval between stripe pattern light beams is desirably controlled to narrow the stripe interval. In an example 27B of FIG. 27, stripes overlap each other, so the interval between stripe pattern light beams needs to be controlled to widen the stripe interval.

In contrast, in an example 27C of FIG. 27, there is no gap between stripes, the ends (outer edges) of stripes are in contact with each other so as to be able to separate the stripes, and thus this stripe interval is optimum. That is, when the measurement target is a rough surface system, the pattern light control unit 1270 controls the interval between stripe pattern light beams to have a stripe interval as shown in 27C of FIG. 27. Also when the measurement target is a perfectly diffusing surface system, the pattern light control unit 1270 controls the interval between stripe pattern light beams to have a similar stripe interval.

Figure 28:
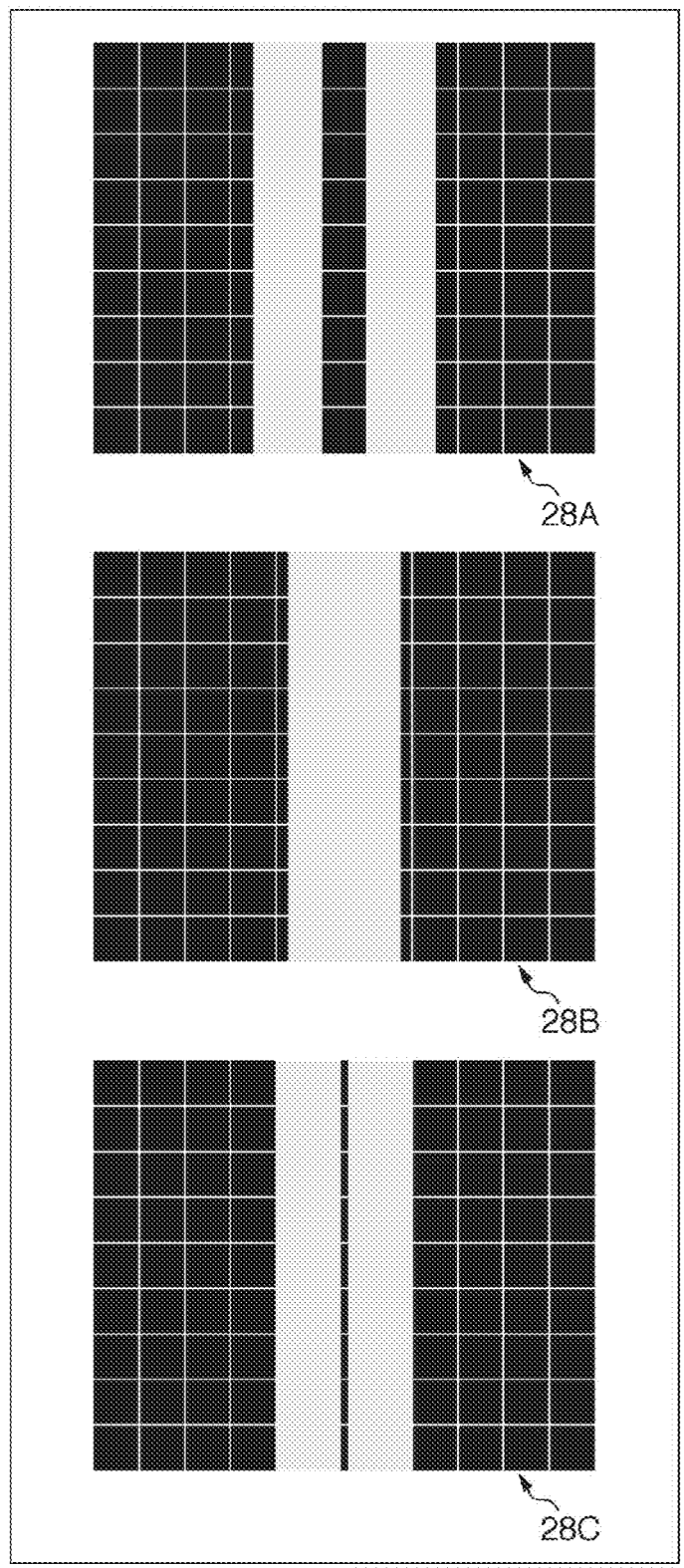
FIG. 28 is a view for explaining the stripe pattern light control method.

FIG. 28 is a schematic view exemplifying reflected light when the measurement target is a mirror surface system and irradiated with a plurality of stripe pattern light beams. Also in the mirror surface system, as in the rough surface system, there is a gap between stripes in a sensed image in 28A of FIG. 28. To extract the scattering characteristic at high precision, the interval between stripe pattern light beams is desirably controlled to narrow the stripe interval. In 28B of FIG. 28, stripes overlap each other, so the interval between stripe pattern light beams is desirably controlled to widen the stripe interval.

To the contrary, in 28C of FIG. 28, there is no gap between stripes, the ends (outer edges) of stripes are in contact with each other so as to be able to separate the stripes, and this stripe interval is optimum. That is, when the measurement target is a mirror surface system, the pattern light control unit 1270 controls the interval between stripe pattern light beams to have a stripe interval as shown in 28C of FIG. 28.

In this fashion, the interval between stripe pattern light beams is changed depending on whether the measurement target is a rough surface system or mirror surface system. The measurement system according to the fourth embodiment can extract the scattering characteristic of the measurement target at high precision.

As is apparent from the above description, the measurement system according to the fourth embodiment further includes the pattern light control unit which controls the interval between stripe pattern light beams, based on information about the extracted scattering characteristic, in addition to the measurement system according to the third embodiment.

The measurement system according to the fourth embodiment can extract the scattering characteristic of a measurement target at high precision regardless of the surface state of the measurement target.

In the examples of FIGS. 27 and 28 described in the fourth embodiment, stripes having the same width are regularly arranged in the horizontal direction. However, the present invention is not limited to this. For example, the pattern light control unit controls the interval between stripe pattern light beams so that even stripes having irregular widths do not overlap each other without any gap. FIG. 29 is a view exemplifying stripes when the interval between stripe pattern light beams is controlled so that stripes having irregular widths do not overlap each other without any gap.

In the fourth embodiment, an optimum stripe interval is an interval at which there is no gap between stripes and the ends (outer edges) of stripes are in contact with each other so as to be able to separate the stripes. However, the definition of the optimum stripe interval is not limited to this.

Figure 30:
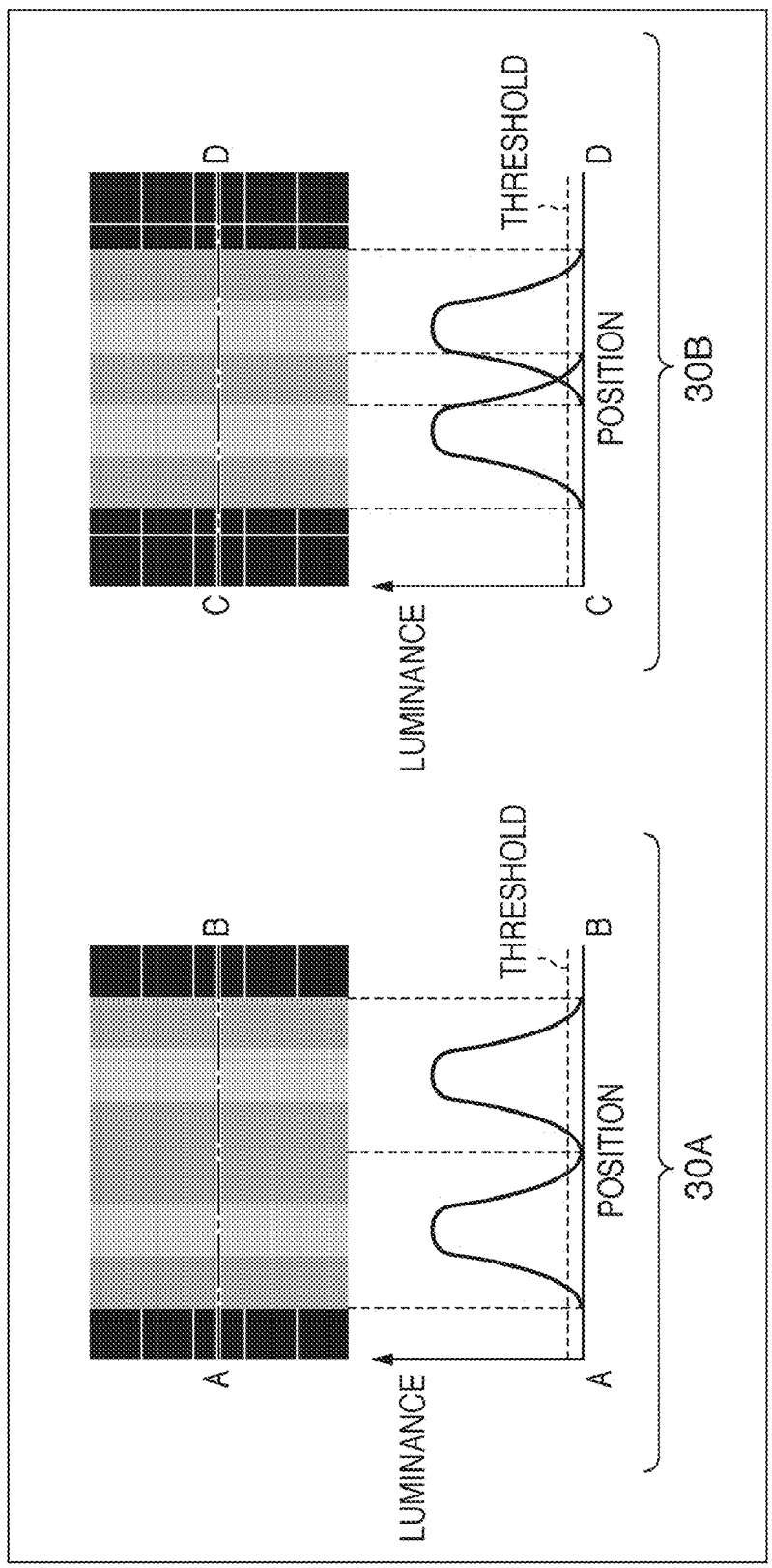
FIG. 30 is a view for explaining the definition of the outer edge of a stripe.

For example, as shown in FIG. 30, an optimum stripe interval may be defined based on a luminance profile on a straight line AB or CD perpendicular to the stripe. More specifically, an optimum stripe interval may be defined based on whether a pixel having a luminance value equal to or smaller than a predetermined threshold exists at a portion where the luminance profiles of respective stripes overlap each other on the straight line AB or CD.

In 30A of FIG. 30, a plurality of pixels each having a luminance value equal to or smaller than the predetermined threshold exist at a portion where the luminance profiles of respective stripes overlap each other on the straight line AB. It is determined that the stripe interval is wide. In 30B of FIG. 30, a pixel having a luminance value equal to or smaller than the predetermined threshold does not exist at a portion where the luminance profiles of respective stripes overlap each other on the straight line CD. It is determined that the stripe interval is narrow.

In the fourth embodiment, a plurality of stripe pattern light beams have the same width, but the present invention is not limited to this. The same control is executed even when a plurality of stripe pattern light beams have different widths.

FIG. 31 is a view showing a state in which the interval between stripe pattern light beams is controlled to have an optimum stripe interval upon emitting a plurality of stripe pattern light beams having different widths. When the stripe pattern light beams include one having a large stripe width, the measurement time can be shortened with almost no adverse effect on measurement precision in a region where the measurement target is almost flat or a region where a change of the shape is constant.

Fifth Embodiment

In the above embodiments, the liquid crystal projector is used as the illumination unit. However, the present invention is not limited to this, and may adopt an illumination unit formed from a light source and DMD (Digital Mirror Device). The use of the DMD is advantageous because the phase of pattern light can be modulated quickly, compared to using the liquid crystal projector. The fifth embodiment of the present invention will be described with reference to the accompanying drawings.

Note that the configuration of a measurement system is the same as that in FIG. 12 described in the second embodiment, and a description thereof will not be repeated.

<1. Detailed Arrangement of Illumination Unit>

FIG. 32 is a schematic view exemplifying an illumination unit 1210 formed from a light source and DMD. Light emitted by a light source 3201 is guided to a DMD 3203 via a lens 3202. The DMD includes a plurality of movable micromirrors.

Figure 33:
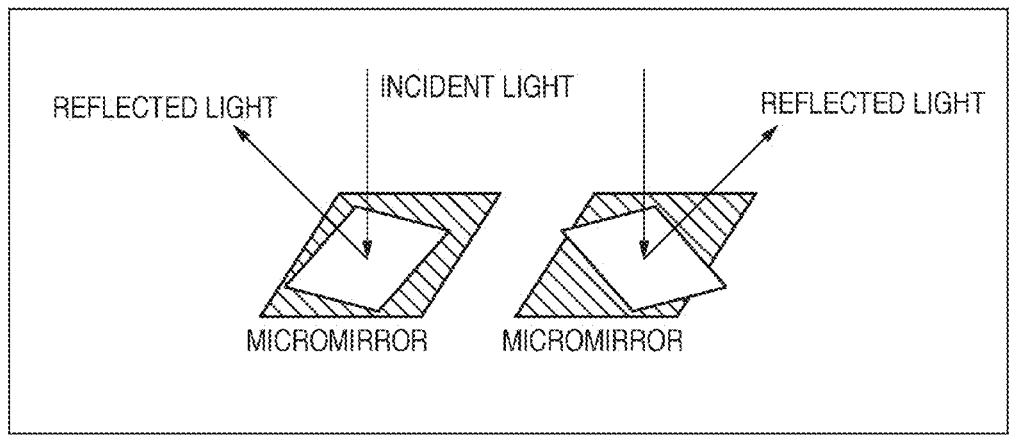
FIG. 33 is a view exemplifying a micromirror.

FIG. 33 is a view exemplifying micromirrors which form the DMD 3203. As shown in FIG. 33, the respective micromirrors can independently change their tilts to change the reflection direction of incident light.

Figure 34:
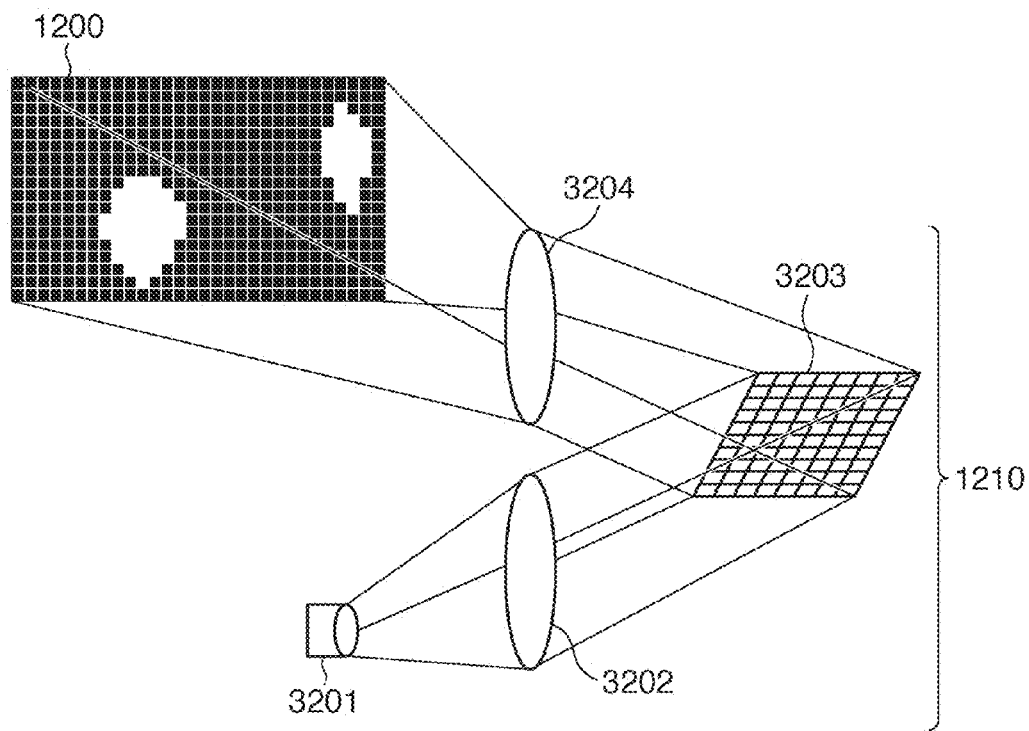
FIG. 34 is a view for explaining a micromirror control method.

With this structure, the DMD 3203 can guide light emitted by the light source 3201 toward a measurement target 1200, or cut it off without guiding it to the measurement target 1200. Light guided to the measurement target 1200 upon changing the reflection direction of reflected light by the DMD 3203 irradiates the measurement target 1200 via a lens 3204. A plurality of micromirrors can simultaneously change the reflection direction to irradiate the measurement target 1200 with pattern light. By individually controlling the micromirrors, a target location can be irradiated with appropriate pattern light, as shown in FIG. 34. When pattern light is emitted using the light source and DMD, the pattern ON/OFF operation can be performed at higher speed, compared to emitting pattern light using the liquid crystal projector. Note that the size of the DMD determines the resolving power of pattern light. In the example of FIG. 32, one dot corresponds to a resolution of four pixels of the DMD, and the dot interval is four pixels.

<2. Sequence of Measurement Processing in Measurement System>

The sequence of measurement processing in the measurement system according to the fifth embodiment will be explained. Note that the sequence of measurement processing in the measurement system according to the fifth embodiment is basically the same as that described in the second embodiment with reference to FIG. 13 except for only pattern light setting signal resetting processing in step S1307. Hence, only the pattern light setting signal resetting processing will be described.

Figure 35:
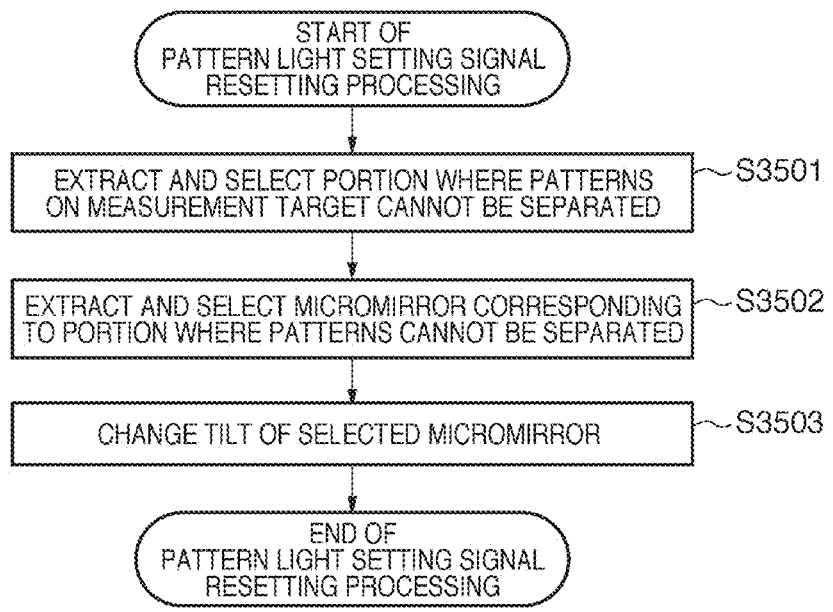
FIG. 35 is a flowchart showing the sequence of pattern light setting signal resetting processing in the measurement system.

FIG. 35 is a flowchart showing the sequence of pattern resetting processing (step S1307) in the measurement system according to the fifth embodiment.

In step S3501, a reflected light extraction unit 1230 or control unit 1260 extracts and selects a portion where patterns (dots or stripes) cannot be separated because the interval between pattern light beams (dot pattern light beams or stripe pattern light beams) is not optimum.

In step S3502, a pattern light characteristic setting unit 1212 or the control unit 1260 functions as an extraction unit and selection unit, and extracts and selects a micromirror corresponding to the portion where the dots cannot be separated.

In step S3503, the pattern light characteristic setting unit 1212 or control unit 1260 changes the tilt of the selected micromirror.

As is apparent from the above description, the illumination unit is formed from the light source and DMD (Digital Mirror Device) in the measurement system according to the fifth embodiment.

With this structure, the optimum pattern light interval can be controlled for each micromirror.

Sixth Embodiment

The fifth embodiment employs the illumination unit formed from the light source and DMD. However, the present invention is not limited to this, and may adopt an illumination unit formed from a 2D multi-array light source and 2D scanning MEMS (Micro Electro Mechanical System) mirror. The sixth embodiment of the present invention will be described with reference to the accompanying drawings.

Note that the configuration of a measurement system is the same as that in FIG. 12 described in the second embodiment, and a description thereof will not be repeated.

<1. Detailed Arrangement of Illumination Unit>

Figure 36:
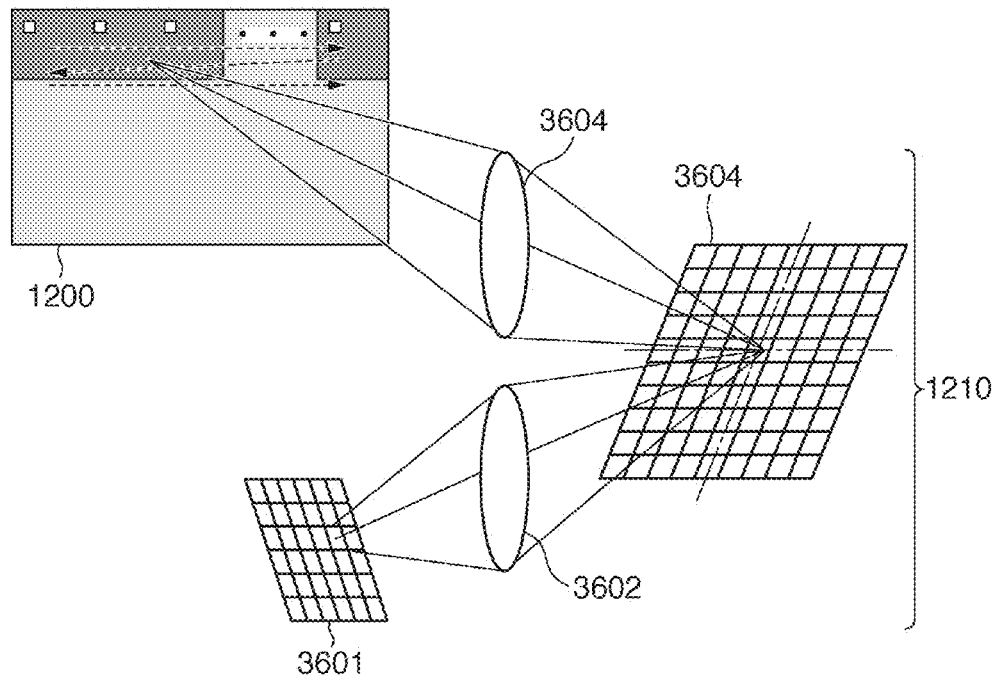
FIG. 36 is a view exemplifying an illumination unit using a 2D multi-array light source and 2D scanning MEMS mirror.

FIG. 36 is a schematic view exemplifying an illumination unit 1210 formed from a 2D multi-array light source and 2D scanning MEMS mirror. Light emitted by a 2D multi-array light source 3601 is guided to a 2D scanning MEMS mirror 3603 via a lens 3602. The 2D scanning MEMS mirror 3603 includes a plurality of movable MEMS mirrors.

Figure 37:
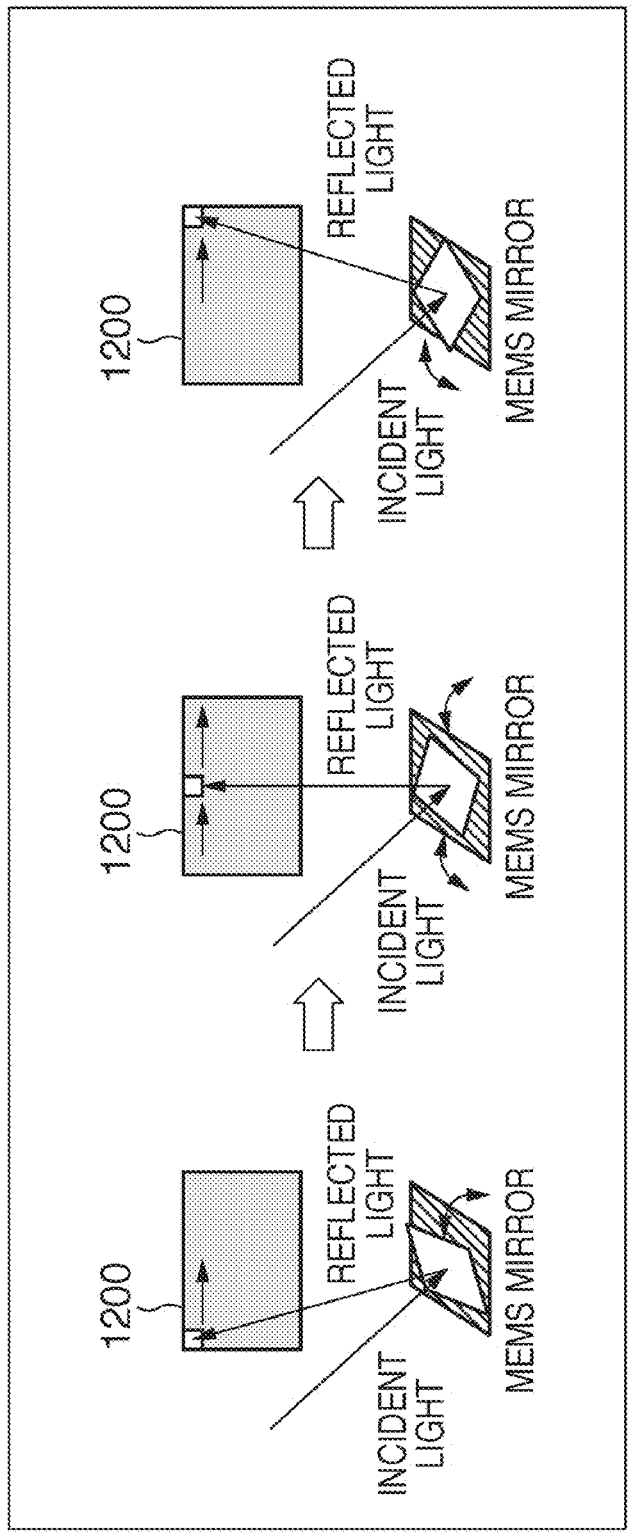
FIG. 37 is a view for explaining a MEMS mirror control method.

FIG. 37 is a view exemplifying MEMS mirrors which form the 2D scanning MEMS mirror 3603. As shown in FIG. 37, the respective MEMS mirrors can independently change their tilts to successively change the reflection direction of incident light. With this structure, the 2D scanning MEMS mirror 3603 can move light emitted by the 2D multi-array light source to an arbitrary irradiation position on a measurement target 1200.

Light emitted by the 2D multi-array light source is reflected by the 2D scanning MEMS mirror 3603 and guided toward the measurement target 1200, irradiating the measurement target 1200 via a lens 3604.

Only a desired region on the measurement target 1200 can be locally selected and irradiated by individually controlling the respective MEMS mirrors of the 2D scanning MEMS mirror 3603. Further, a plurality of regions can be parallel-irradiated.

Figure 38:
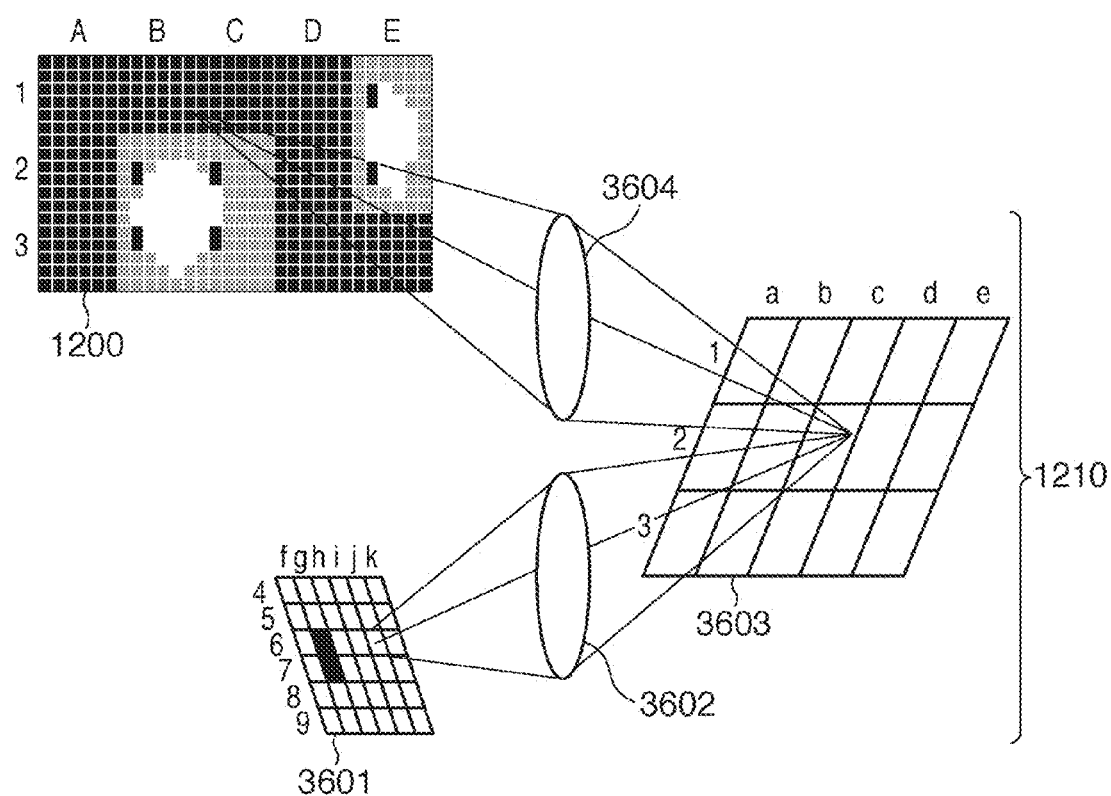
FIG. 38 is a view for explaining a method of controlling the 2D multi-array light source and 2D scanning MEMS mirror.

FIG. 38 is a view showing a state in which a desired region on the measurement target 1200 is locally selected and irradiated by individually controlling the respective MEMS mirrors of the 2D scanning MEMS mirror 3603. In FIG. 38, regions B2, B3, C2, C3, E1, and E2 on the measurement target 1200 are to be irradiated with dot pattern light. In this case, these regions can be irradiated with dot pattern light by parallel-operating only MEMS mirrors b2, b3, c2, c3, e1, and e2 corresponding to these regions in the 2D scanning MEMS mirror 3603.

The use of the 2D scanning MEMS mirror 3603 allows simultaneously parallel-scanning only necessary local regions, unlike scanning the entire measurement target 1200 and irradiating it with dot pattern light. This can shorten the measurement time.

When the measurement target is divided into a plurality of regions, the light source having the 2D multi-array light source arrangement can irradiate points at the same coordinates simultaneously with a plurality of dot pattern light beams. Also, respective light sources can be individually controlled to turn on only a light source corresponding to a region to be irradiated in the measurement target 1200, and turn off a light source corresponding to a region not to be irradiated.

For example, in FIG. 38, portions g6 and g7 of the 2D multi-array light source 3601 do not emit dot pattern light to any of the regions B2, B3, C2, C3, E1, and E2 to be irradiated with dot pattern light on the measurement target 1200. It can be controlled to turn off g6 and g7 of the 2D multi-array light source 3601 and turn on only the remaining portions. Since only a necessary portion of the light source can be turned on, power consumption can be suppressed in comparison with scanning the entire measurement target 1200 and irradiating it with dot pattern light.

<2. Sequence of Measurement Processing in Measurement System>

The sequence of measurement processing in the measurement system according to the sixth embodiment will be explained. Note that the sequence of measurement processing in the measurement system according to the sixth embodiment is basically the same as that described in the second embodiment with reference to FIG. 13 except for only pattern resetting processing in step S1307. Therefore, only the pattern resetting processing will be described.

Figure 39:
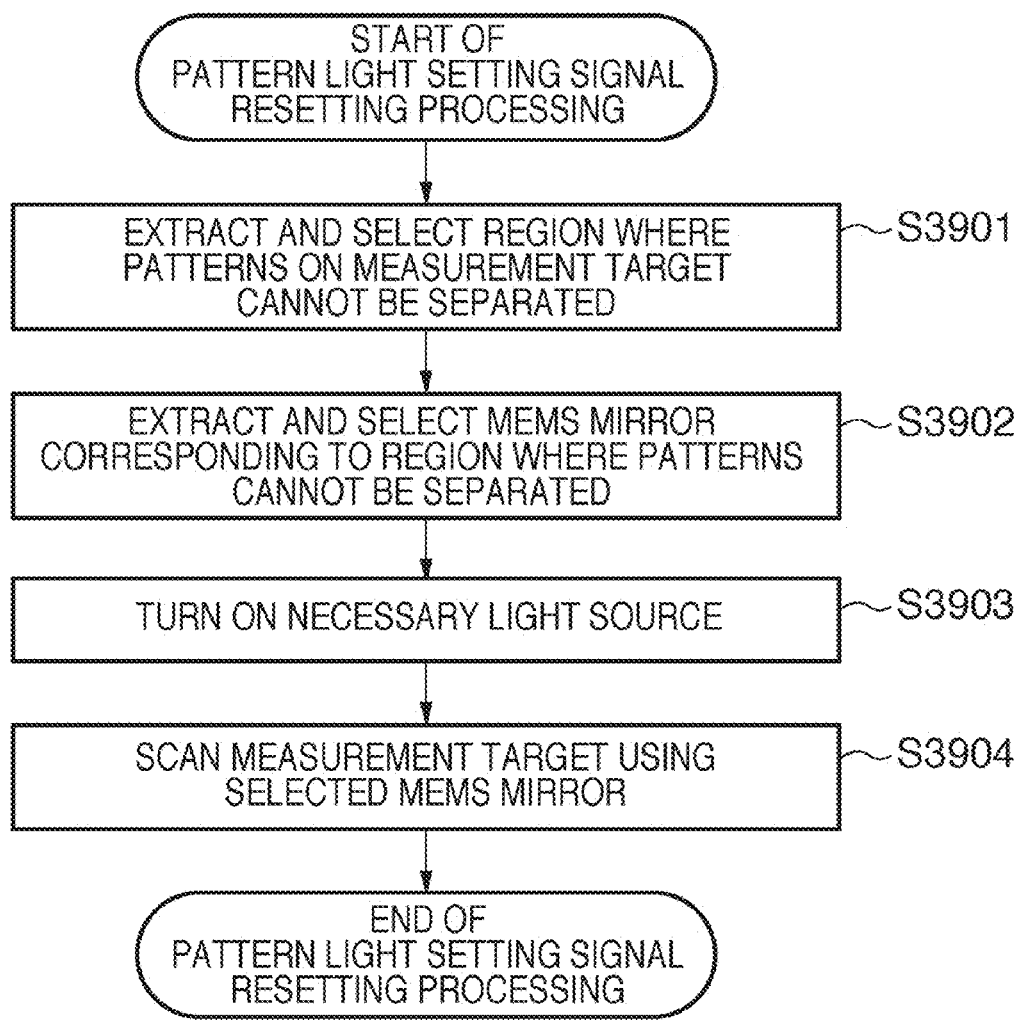
FIG. 39 is a flowchart showing the sequence of pattern light setting signal resetting processing in the measurement system.

FIG. 39 is a flowchart showing the sequence of pattern light setting signal resetting processing (step S1307) in the measurement system according to the sixth embodiment.

In step S3901, a reflected light extraction unit 1230 or control unit 1260 extracts and selects a portion where patterns (dots or stripes) cannot be separated because the interval between pattern light beams (dot pattern light beams or stripe pattern light beams) is not optimum.

In step S3902, a pattern light characteristic setting unit 1212 or the control unit 1260 extracts and selects a MEMS mirror corresponding to the portion where the patterns (dots or stripes) cannot be separated.

In step S3903, the pattern light characteristic setting unit 1212 or control unit 1260 turns on a light source corresponding to a portion to be irradiated with pattern light.

In step S3904, the pattern light characteristic setting unit 1212 or control unit 1260 continuously changes the tilt of the selected MEMS mirror to scan the measurement target 1200.

As is apparent from the above description, the measurement system according to the sixth embodiment adopts the illumination unit formed from the 2D multi-array light source and 2D scanning MEMS mirror.

In the measurement system according to the sixth embodiment, only necessary local regions can be parallelly scanned. In addition, identical regions can be simultaneously irradiated. Power consumption can be suppressed by turning off a light source corresponding to a portion not to be irradiated.

Seventh Embodiment

In the foregoing embodiments, pattern light beams (dot pattern light beams or stripe pattern light beams) are emitted to form patterns (dots or stripes) as densely as possible in order to extract the scattering characteristic of the surface of a measurement target at high precision. However, the present invention is not limited to this. For example, the phases of pattern light beams (dot pattern light beams or stripe pattern light beams) may be modulated instead of controlling the interval between pattern light beams (dot pattern light beams or stripe pattern light beams). The seventh embodiment of the present invention will be described with reference to the accompanying drawings.

Note that the configuration of a measurement system is the same as that in FIG. 12 described in the second embodiment, and a description thereof will not be repeated.

<1. Pattern Light Phase Modulation>

Figure 40:
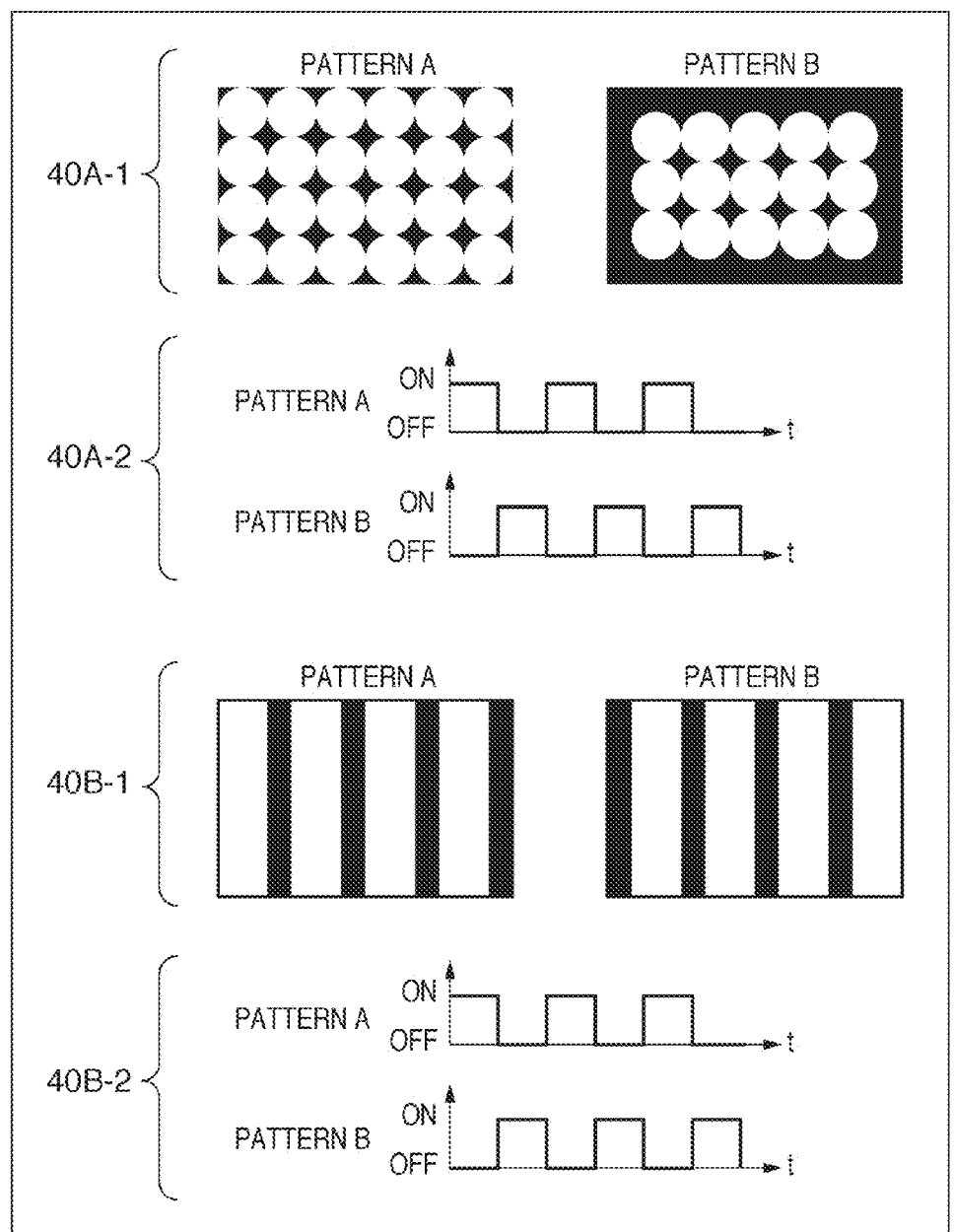
FIG. 40 is a view for explaining modulation of the phase of pattern light.

FIG. 40 is a view showing a state in which the phases of pattern light beams (dot pattern light beams or stripe pattern light beams) are modulated to extract the scattering characteristic of the surface of a measurement target at high precision.

In FIG. 40, reference numerals 40A-1 and 40A-2 denote dot pattern light examples; 40B-1 and 40B-2, stripe pattern light examples. In any case, patterns (dots or stripes) overlap each other upon simultaneous irradiation of patterns A and B. The overlapping patterns can be separated by shifting their irradiation timings.

By shifting irradiation timings, a portion not irradiated with pattern A is irradiated with pattern B. A region which cannot be measured using pattern A can be measured using pattern B. In other words, the scattering characteristic of the surface of the measurement target can be extracted at high precision.

<2. Sequence of Measurement Processing in Measurement System>

Figure 41:
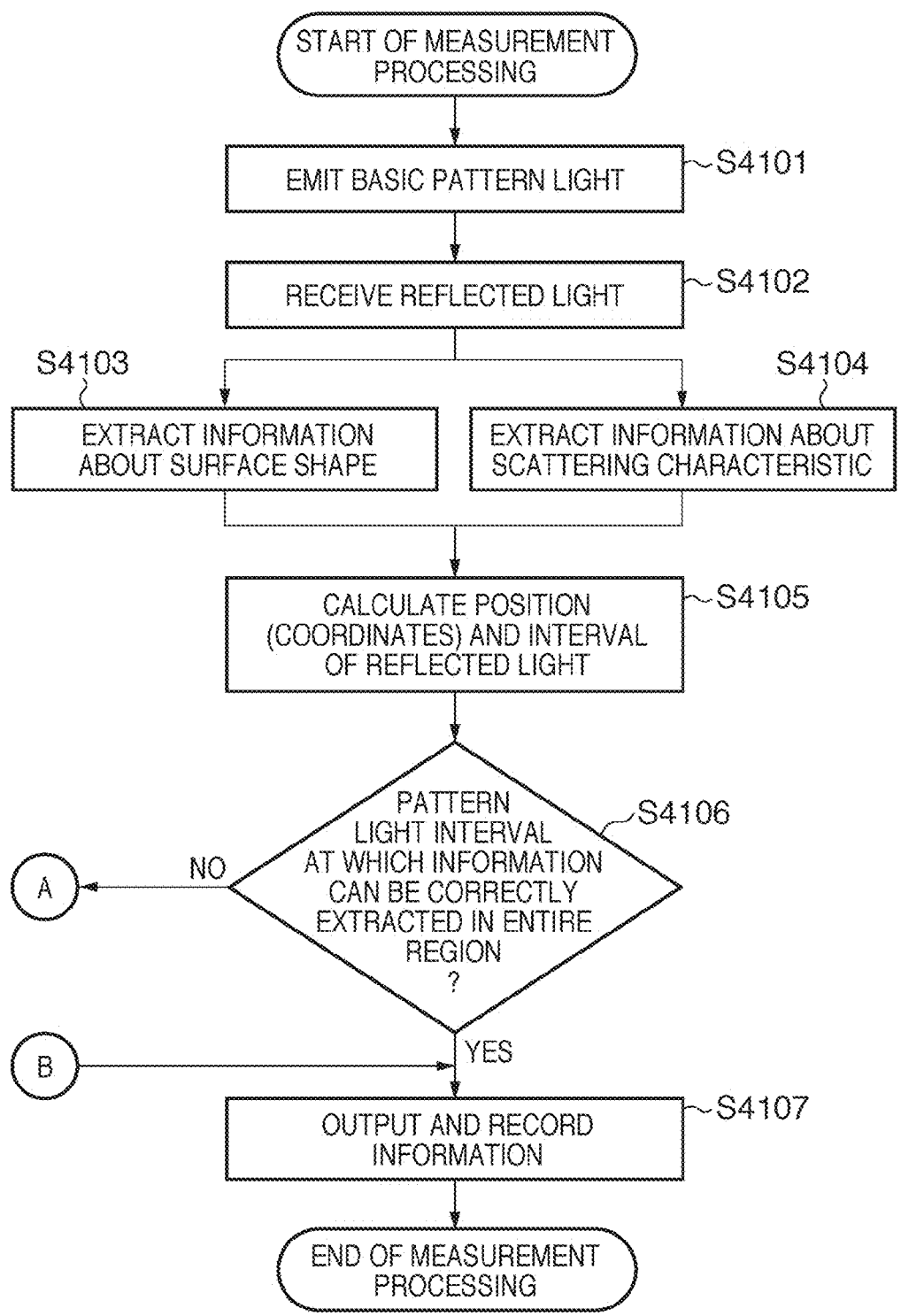
FIG. 41 is a flowchart showing the sequence of measurement processing in the measurement system.
Figure 42:
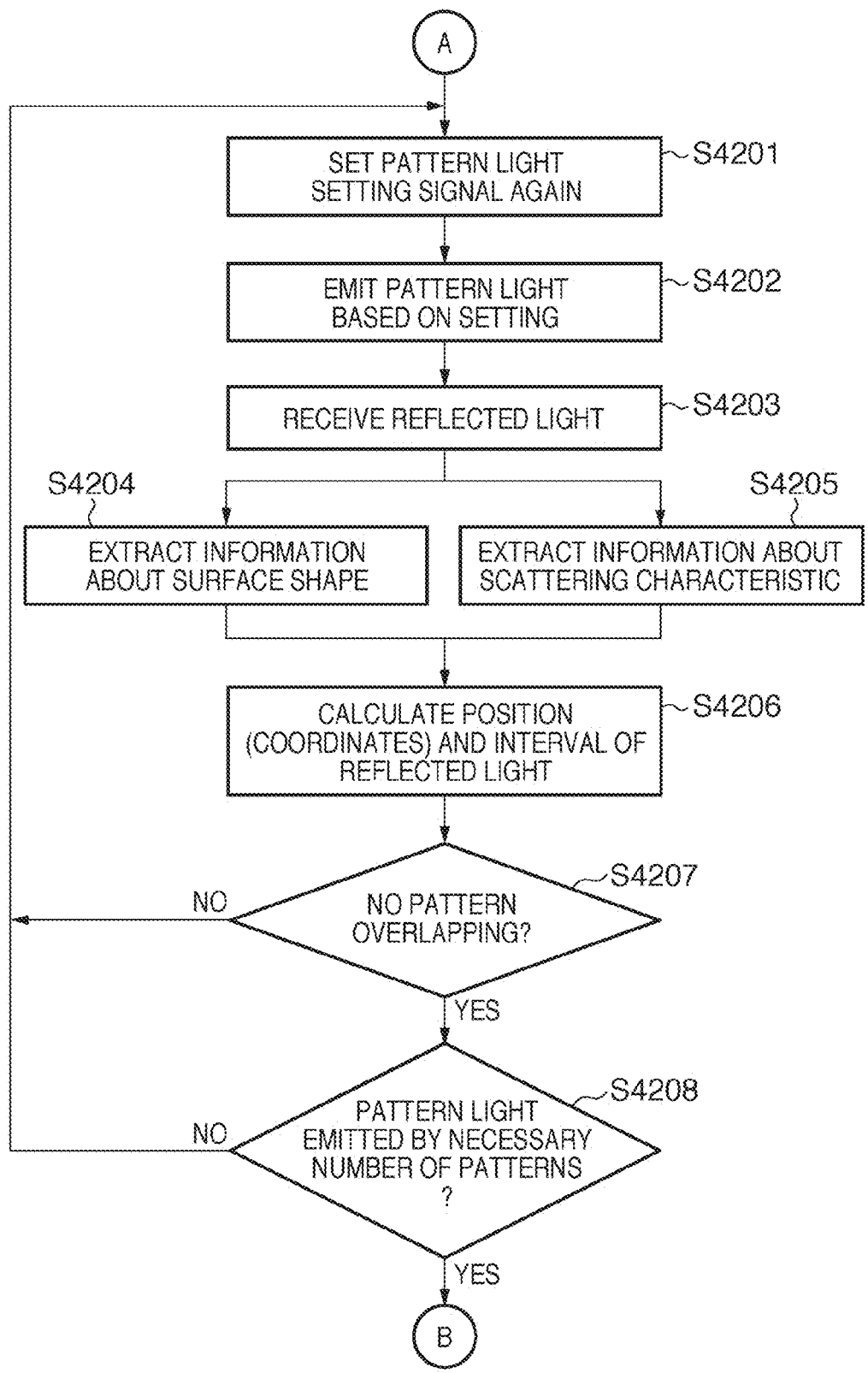
FIG. 42 is a flowchart showing the sequence of measurement processing in the measurement system.

The sequence of measurement processing in the measurement system according to the seventh embodiment will be explained. FIGS. 41 and 42 are flowcharts showing the sequence of measurement processing in the measurement system according to the seventh embodiment.

Steps S4101 to S4107 correspond to steps S1301 to S1306 and S1309 in measurement processing described in the second embodiment with reference to FIG. 13. A description of processes in these steps will not be repeated, and steps (steps S4201 to S4208) different from the measurement processing shown in FIG. 13 will be explained.

In step S4201, a pattern light control unit 1270 transmits a pattern light setting signal to an illumination unit 1210. In the illumination unit 1210, the pattern light setting signal is set again.

In step S4202, the illumination unit 1210 irradiates a measurement target 1200 with pattern light (dot pattern light or stripe pattern light) based on the reset pattern light setting signal.

In step S4203, a control unit 1260 instructs a reflected light measurement unit 1220 to receive the reflected light of the pattern light (dot pattern light or stripe pattern light) which has irradiated the measurement target 1200.

In step S4204, a reflected light extraction unit 1230 functions as a surface shape extraction unit, and extracts information about the surface shape of the measurement target 1200, based on the reflected light received by the reflected light measurement unit 1220.

In step S4205, the reflected light extraction unit 1230 functions as a scattering characteristic extraction unit, and extracts information about the scattering characteristic of the measurement target 1200, based on the reflected light received by the reflected light measurement unit 1220.

In step S4206, the reflected light extraction unit 1230 functions as a scattering characteristic extraction unit, and calculates the position (coordinates) of a pattern (dot or stripe) and the interval (distance) between patterns (dots or stripes), based on the reflected light received by the reflected light measurement unit 1220.

In step S4207, the reflected light extraction unit 1230 or control unit 1260 functions as a determination unit. More specifically, whether adjacent patterns overlap each other is determined based on the calculated pattern position and pattern interval. If it is determined that adjacent patterns overlap each other, the process returns to step S4201. If it is determined that adjacent patterns do not overlap each other, the process shifts to step S4208.

In step S4208, the reflected light extraction unit 1230 or control unit 1260 functions as a determination unit, and determines whether pattern light has been emitted by the number of times enough to extract the surface shape and scattering characteristic. If it is determined that pattern light has been emitted by the number of times enough to extract the surface shape and scattering characteristic, the process shifts to step S4107. If it is determined that pattern light has not been emitted by the number of times enough to extract the surface shape and scattering characteristic, the process returns to step S4201.

As is apparent from the above description, in the seventh embodiment, the phase of irradiation pattern light (dot pattern light or stripe pattern light) is modulated (irradiation timings are shifted). Even if patterns (dots or stripes) overlap each other, they can be separated. Consequently, pattern light beams (dot pattern light beams or stripe pattern light beams) can be emitted to form patterns (dots or stripes) more densely, extracting the scattering characteristic of the surface of the measurement target at higher precision.

Eighth Embodiment

In the seventh embodiment, the phases of pattern light beams (dot pattern light beams or stripe pattern light beams) are modulated to extract the scattering characteristic of the surface of a measurement target at high precision. However, the present invention is not limited to this. For example, the wavelengths of pattern light beams (dot pattern light beams or stripe pattern light beams) may be changed. The eighth embodiment of the present invention will be described with reference to the accompanying drawings.

Note that the configuration of a measurement system is the same as that in FIG. 12 described in the second embodiment. The sequence of measurement processing is the same as that in FIGS. 41 and 42 described in the seventh embodiment. A description of them will not be repeated.

Figure 43:
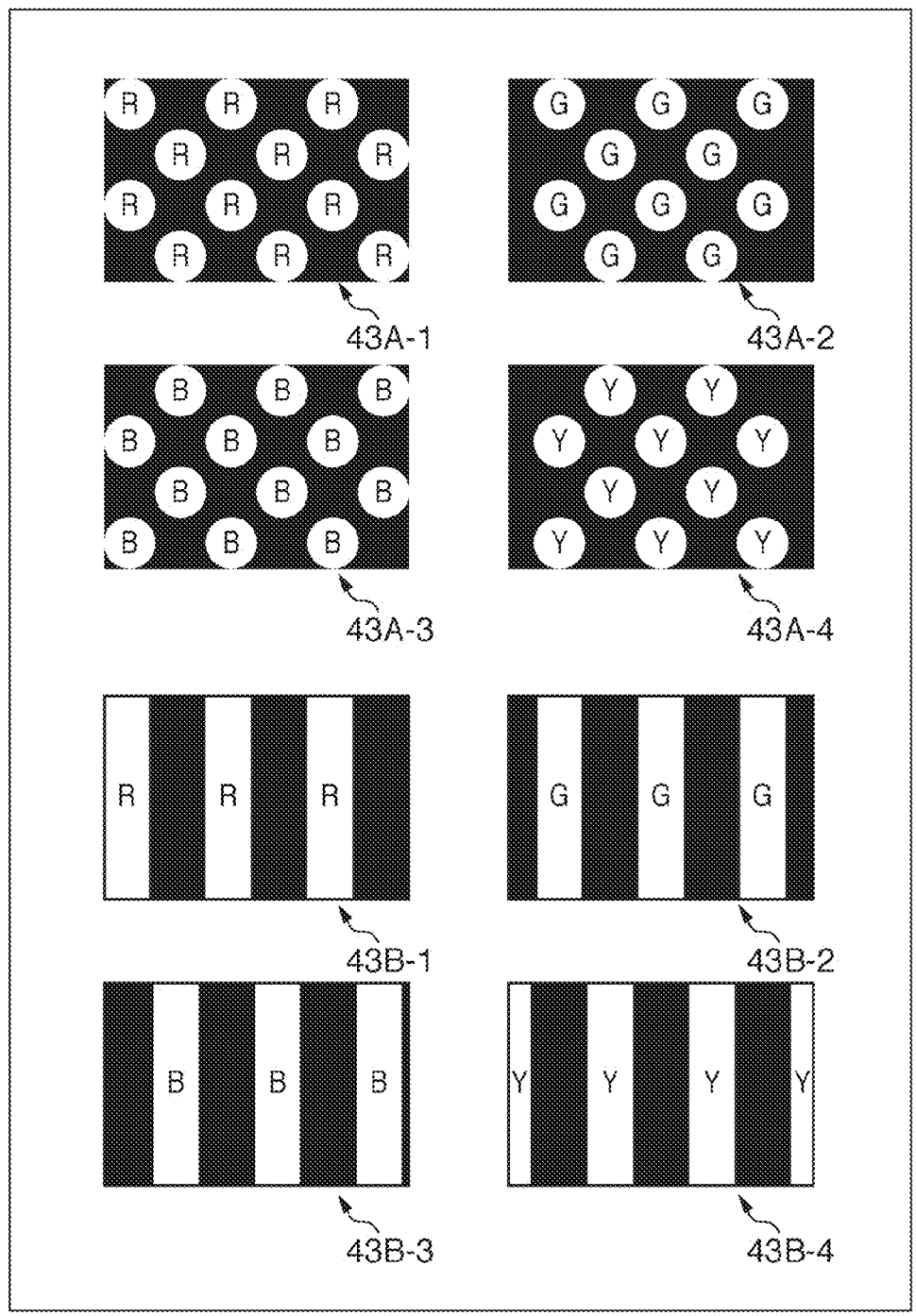
FIG. 43 is a view for explaining change of the wavelength of pattern light.

FIG. 43 is a view showing a state in which the wavelengths of pattern light beams (dot pattern light beams or stripe pattern light beams) are changed to extract the scattering characteristic of the surface of a measurement target at high precision.

In FIG. 43, reference numerals 43A-1 and 43A-2 denote images sensed upon irradiation with dot pattern light of the red wavelength component and that of the green wavelength component, respectively. Reference numerals 43A-3 and 43A-4 denote images sensed upon irradiation with dot pattern light of the blue wavelength component and that of the yellow wavelength component, respectively.

Reference numerals 43B-1 and 43B-2 denote images sensed upon irradiation with stripe pattern light of the red wavelength component and that of the green wavelength component, respectively. Reference numerals 43B-3 and 43B-4 denote images sensed upon irradiation with stripe pattern light of the blue wavelength component and that of the yellow wavelength component, respectively.

When the measurement target is irradiated with respective dot pattern light beams corresponding to dots shown in 43A-1 to 43A-4, dots overlap each other. However, the dot pattern light beams have different wavelengths, so a reflected light measurement unit 1220 can separate the dots into respective wavelength components.

By changing the wavelengths of irradiation dot pattern light beams, a region not irradiated with dot pattern light of the red wavelength component can be irradiated with those of the green, blue, and yellow wavelength components. That is, the scattering characteristic of the surface of a measurement target can be extracted at high precision.

Similarly, when the measurement target is irradiated with respective stripe pattern light beams corresponding to stripes shown in 43B-1 to 43B-4, stripes overlap each other. However, since the stripe pattern light beams have different wavelengths, the reflected light measurement unit 1220 can separate the stripes into respective wavelength components.

By changing the wavelengths of irradiation stripe pattern light beams, a region not irradiated with stripe pattern light of the red wavelength component can be irradiated with those of the green, blue, and yellow wavelength components. In other words, the scattering characteristic of the surface of a measurement target can be extracted at high precision.

Ninth Embodiment

In the eighth embodiment, the wavelengths of pattern light beams (dot pattern light beams or stripe pattern light beams) are changed to extract the scattering characteristic of the surface of a measurement target at high precision. However, the present invention is not limited to this. For example, the polarization characteristics of pattern light beams (dot pattern light beams or stripe pattern light beams) may be changed. The ninth embodiment of the present invention will be described with reference to the accompanying drawings.

Note that the configuration of a measurement system is the same as that in FIG. 12 described in the second embodiment. The sequence of measurement processing is the same as that in FIGS. 41 and 42 described in the seventh embodiment. A description of them will not be repeated.

FIG. 44 is a view showing a state in which the polarization characteristics of pattern light beams (dot pattern light beams or stripe pattern light beams) are changed to extract the scattering characteristic of the surface of a measurement target at high precision.

In FIG. 44, reference numerals 44A-1 and 44A-2 denote images sensed upon irradiation with dot pattern light of s-polarized light and that of p-polarized light, respectively. Reference numerals 44B-1 and 44B-2 denote images sensed upon irradiation with stripe pattern light of s-polarized light and that of p-polarized light, respectively.

When the measurement target is irradiated with respective dot pattern light beams corresponding to dots shown in 44A-1 and 44A-2, dots overlap each other. However, the dot pattern light beams have different polarization characteristics, so a reflected light measurement unit 1220 can separate the dots into respective polarization characteristics.

By switching the polarization characteristics of irradiation dot pattern light beams, a region not irradiated with dot pattern light of the s-polarized light component can be irradiated with that of the p-polarized light component. That is, the scattering characteristic of the surface of a measurement target can be extracted at high precision.

Similarly, when the measurement target is irradiated with respective stripe pattern light beams corresponding to stripes shown in 44B-1 and 44B-2, stripes overlap each other. However, since the stripe pattern light beams have different polarization characteristics, the reflected light measurement unit can separate the stripes into respective polarization characteristics.

By switching the polarization characteristics of irradiation stripe pattern light beams, a region not irradiated with pattern light of the s-polarized light component can be irradiated with that of the p-polarized light component. In other words, the scattering characteristic of the surface of a measurement target can be extracted at high precision.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-150322 filed Jun. 24, 2009, which is hereby incorporated by reference herein in its entirety.

What is claimed is:

1. A measurement system comprising:
an irradiation unit configured to irradiate a measurement target with predetermined pattern light at a predetermined incident angle;
a reception unit configured to receive, at a reflection angle substantially equal to the incident angle, reflected light of the pattern light irradiating the measurement target;
a first extraction unit configured to extract information about a surface shape of the measurement target in a region irradiated with the pattern light, based on a shift amount between a light receiving position of the reflected light received by said reception unit, and a predetermined reference position;
a second extraction unit configured to extract, as information about a scattering characteristic of the measurement target in the region irradiated with the pattern light, information about a luminance value of the reflected light received by said reception unit, and information indicating a spread of the pattern light upon reflection by the measurement target; and
a control unit configured to control the pattern light emitted by said irradiation unit to have an interval at which outer edges of adjacent patterns are in contact with each other in an image obtained by receiving the reflected light by said reception unit on the basis of the information about the scattering characteristic of the measurement target that is extracted by said second extraction unit.

2. The system according to claim 1, wherein
the pattern light includes pattern light beams having different phases,
said control unit controls pattern light emitted by said irradiation unit to make adjacent patterns having different phases overlap each other in an image obtained by receiving the reflected light by said reception unit, and
said reception unit receives pattern light beams of respective phases that have been emitted by said irradiation unit at timings corresponding to the respective phases.

3. The system according to claim 1, wherein
the pattern light includes pattern light beams having different wavelength components or different polarization components,
said control unit controls pattern light emitted by said irradiation unit to make adjacent patterns having different wavelength components or different polarization components overlap each other in an image obtained by receiving the reflected light by said reception unit, and
said reception unit receives the pattern light beams for respective wavelength components or respective polarization components.

4. The system according to claim 1, wherein the pattern light includes one of dot pattern light having a predetermined diameter, and stripe pattern light having a predetermined width.

5. The system according to claim 4, wherein said second extraction unit extracts, as the information indicating a spread of the pattern light, one of a dot diameter of the dot pattern light and a stripe width of the stripe pattern light.

6. The system according to claim 5, further comprising a setting unit configured to set focus positions at a plurality of different positions in a reflection direction of the reflected light of the pattern light,
wherein said second extraction unit extracts, as the information indicating a spread of the pattern light, one of an enlargement ratio obtained by comparing dot diameters of the dot pattern light at the respective focus positions, and an enlargement ratio obtained by comparing stripe widths of the stripe pattern light.

7. A measurement processing method in a measurement system, the method comprising the steps of:
causing an irradiation unit to irradiate a measurement target with predetermined pattern light at a predetermined incident angle;
causing a reception unit to receive, at a reflection angle substantially equal to the incident angle, reflected light of the pattern light irradiating the measurement target;
causing a first extraction unit to extract information about a surface shape of the measurement target in a region irradiated with the pattern light, based on a shift amount between a light receiving position of the reflected light received in the step of causing a reception unit to receive reflected light, and a predetermined reference position;
causing a second extraction unit to extract, as information about a scattering characteristic of the measurement target in the region irradiated with the pattern light, information about a luminance value of the reflected light received in the step of causing a reception unit to receive reflected light, and information indicating a spread of the pattern light upon reflection by the measurement target; and
causing a control unit to control the pattern light emitted by the irradiation unit to have an interval at which outer edges of adjacent patterns are in contact with each other in an image obtained by receiving the reflected light by said reception unit on the basis of the information about the scattering characteristic of the measurement target that is extracted in the step of causing a second extraction unit to extract information.

8. A control program stored in a computer-readable storage medium for causing a computer to execute steps of a measurement processing method defined in claim 7.

* * * * *